(12) United States Patent
Hampshire

(10) Patent No.: US 11,646,138 B2
(45) Date of Patent: May 9, 2023

(54) SUPERCONDUCTING MAGNET

(71) Applicant: UNIVERSITY OF DURHAM, Durham (GB)

(72) Inventor: Damian Hampshire, Durham (GB)

(73) Assignee: University of Durham, Durham (GB)

( * ) Notice: Subject to any disclaimer, the term of this patent is extended or adjusted under 35 U.S.C. 154(b) by 361 days.

(21) Appl. No.: 16/611,840

(22) PCT Filed: May 9, 2018

(86) PCT No.: PCT/GB2018/051242
§ 371 (c)(1),
(2) Date: Nov. 7, 2019

(87) PCT Pub. No.: WO2018/206944
PCT Pub. Date: Nov. 15, 2018

(65) Prior Publication Data
US 2020/0168349 A1    May 28, 2020

(30) Foreign Application Priority Data
May 9, 2017 (GB) ..................................... 1707392

(51) Int. Cl.
*H01F 6/06* (2006.01)
*G21B 1/05* (2006.01)
*G21B 1/11* (2006.01)
*H01F 6/00* (2006.01)

(52) U.S. Cl.
CPC ................ *G21B 1/057* (2013.01); *G21B 1/11* (2013.01); *H01F 6/00* (2013.01); *H01F 6/06* (2013.01)

(58) Field of Classification Search
CPC .......................... G21B 1/057; H01F 6/00–6/06
See application file for complete search history.

(56) References Cited

U.S. PATENT DOCUMENTS 3,736,539 A * 5/1973 File ........................... H05H 1/12
                                                         505/879
4,263,096 A * 4/1981 Ohkawa ................... H05H 1/12
                                                         336/225

(Continued)

OTHER PUBLICATIONS

B.N. Sorbom et al., "ARC: A compact, high-field, fusion nuclear science facility and demonstration powerplant with demountable magnets," Fusion Engineering and Design, vol. 100, pp. 378-405 (Nov. 2015) (available at https://www.sciencedirect.com/science/article/pii/S0920379615302337).

(Continued)

*Primary Examiner* — Alexander Talpalatski
(74) *Attorney, Agent, or Firm* — Gurr Brande & Spendlove, PLLC.; Robert Dan Spendlove

(57) ABSTRACT

A superconducting magnet for producing part of a substantially toroidal field in a device is described. The magnet comprises: a set of conductors comprising one or more first conductors (31*f*) and one or more second conductors (32*f*), and a set of joints (33). Each of the joints (33) connects a region of a first conductor (31*f*) with a region of a second conductor (32*f*) to form a series of alternating first and second conductors corresponding to at least part of a winding of the magnet. Each of the joints (33) is positioned away from a midplane of the toroidal field. The joints (33) are positioned on alternating sides of the midplane. Each first conductor (3 If) passes through the midplane at a smaller distance from an axis of rotation of the toroidal field than does each second conductor (32*f*). Each of the regions is elongate and extends in a direction at least partly away from the midplane.

20 Claims, 14 Drawing Sheets

(56) References Cited

U.S. PATENT DOCUMENTS

| | | | | |
|---|---|---|---|---|
| 4,268,353 A | * | 5/1981 | Powell | H05H 1/12 |
| | | | | 976/DIG. 6 |
| 4,437,080 A | * | 3/1984 | Ekin | H01F 6/06 |
| | | | | 505/887 |
| 4,472,344 A | * | 9/1984 | Lofstedt | H01F 7/202 |
| | | | | 335/216 |
| 4,749,540 A | | 6/1988 | Bogart et al. | |
| 4,774,048 A | * | 9/1988 | Yang | G21B 1/057 |
| | | | | 376/142 |
| 6,054,913 A | * | 4/2000 | Leuer | H01F 6/00 |
| | | | | 335/216 |

OTHER PUBLICATIONS

D.G. Filatov et al., "Toroidal field system with demountable multiturn coils for neutron source based on tokamak," Fusion Engineering, 17th IEEE/NPSS Symposium, pp. (Oct. 2017) (available at https://ieeexplore.ieee.org/document/687035).

Franco J. Mangiarotti, Design of Demountable Toroidal Field Coils With REBCO Superconductors for an ARIES-I Class Fusion Reactor (Feb. 2016) (Ph.D. dissertation, Mass. Inst. of Tech.) (available at https://dspace.mit.edu/bitstream/handle/1721.1/103659/953412569-MIT.pdf).

M. Huguet et al., "Key engineering features of the ITER-FEAT magnet system and implications for the R&D programme," Nuclear Fusion, vol. 41, No. 10 (Oct. 2001) (available at https://www.osti.gov/etdeweb/servlets/purl/20261538).

International Search Report; International Patent Application No. PCT/GB2018/051242; University of Durham; dated Oct. 15, 2018.

Written Opinion of the International Searching Authority, International Patent Application No. PCT/GB2018/051242; University of Durham; dated Oct. 15, 2018.

* cited by examiner

SUPERCONDUCTING MAGNET

FIELD

The present application relates to a superconducting magnet, particularly a superconducting magnet for producing part of a substantially toroidal field in a device such as a tokamak.

BACKGROUND

A Known Tokamak

Referring to FIGS. 1-5, a known design of a tokamak 1 will now be described. The tokamak 1 is a magnetic confinement fusion reactor. The tokamak 1 has a height of ~30 metres and a weight of about ~20,000 tonnes.

Referring in particular to FIG. 1 (which is a cutaway view), the tokamak 1 includes a vacuum vessel 2 and several superconducting magnet systems 3, 4, 5.

The vacuum vessel 2 holds, during operation, a plasma of deuterium and tritium heated to a temperature of over 100 million Celsius and involved in a fusion reaction.

Referring in particular to FIGS. 2A and 2B, the vacuum vessel 2 has a toroidal shape with a substantially D-shaped cross section. The vacuum vessel 2 is constructed from double-walled stainless steel. The vacuum vessel 2 holds a so-called blanket (not shown), which lines the inner surface of the vacuum vessel 2 and acts as a shield against high-energy neutrons produced by the reaction. The vacuum vessel 2 also holds a diverter (not shown), which extracts heat produced by the reaction.

Referring again to FIG. 1, the tokamak 1 includes a set of sixteen toroidal field coils 3 (hereinafter generally referred to as TF coils), about half of which are illustrated in the figure.

Referring in particular to FIGS. 2A and 2B, each TF coil 3 is substantially D-shaped and encircles a section of the toroidal vacuum vessel 2. During operation, the TF coils 3 produce a (magnetic) field 6 (hereinafter referred to as the toroidal field). The toroidal field 6 has a toroidal shape with a cross-section that approximately corresponds to the region enclosed by a TF coil 3. The toroidal field 6 has substantially circular field lines circulating around a main axis 7 (also defined in the paragraph below). The toroidal field 6 is the primary field that serves to confine the plasma 3.

The axis 7 of rotation of the toroid corresponding to the toroidal field 6 is hereinafter generally referred to as the main axis. The main axis 7 is substantially vertical. The midplane 8 of the toroidal field 6, i.e. the plane perpendicular to the main axis 7 that divides the toroidal field 6 into two substantially equal parts, is hereinafter generally referred to as "the midplane". The midplane 8 is substantially horizontal. The main axis 7 and the midplane 8 are used herein to describe positions, directions, and so forth.

Referring in particular to FIG. 2A, each TF coil 3 includes a shell 3a. Referring in particular to FIGS. 3A-C, each TF coil 3 includes a winding pack 3b within the shell 3a. The winding pack 3b includes seven so-called double pancakes 3c. Each double pancake 3c includes a plate 3d, which is substantially D-shaped and which has a spiral groove 3e on both of its major surfaces. A single cable-in-conduit conductor 3f (hereinafter generally referred to as "the conductor") is arranged in the two grooves 3e.

Referring in particular to FIG. 4, the conductor 3f has a jacket 3fa, which contains a large number of (~1,000) superconducting strands 3fb, and a (central) cooling channel 3fc which, during operation, carries helium fluid at a temperature of ~4.5 kelvin. The superconducting strands 3fb include the low-temperature superconductor, niobium-tin ($Nb_3Sn$).

Referring again to FIG. 3A, conductors 3f in neighbouring double pancakes 3c are joined by "inter-pancake" joints 3g at the bottom of the TF coil 3. A conductor 3f in each of the first and last double pancakes 3c are joined to an electrical power system by "terminal" joints 3h. Each of the inter-pancake joints 3g has a so-called praying-hands configuration. Each of the terminal joints 3h has a so-called shaking-hands configuration.

Referring in particular to FIG. 5 (which is a horizontal cross-sectional view), each inter-pancake joint 3g comprises two boxes 3ga. Each box 3ga comprises a stainless steel part 3gb and a copper part 3gc. The stainless steel and copper parts 3gb, 3gc are explosion bonded. A length of conductor 3f (without some of its insulating parts) is forced into a hole in each box 3ga. The copper parts 3gc of the boxes 3ga are soldered together using tin-lead solder 3gd, and the two boxes 3ga are clamped together with steel clamps 3ge.

Referring again to FIG. 1, the tokamak 1 includes six poloidal field coils 4 (hereinafter referred to as PF coils). Each PF coil 4 is ring-shaped. Each PF coil 4 is centred on the main axis 7, and is orientated horizontally. The uppermost and lowermost PF coils 4 are the smallest of the PF coils 4 and lie above and below the TF coils 3, respectively. The remaining PF coils 4 encircle the TF coils 3. Each PF coil 4 is made using the low-temperature superconductor, niobium-titanium (NbTi). During operation, the PF coils 4 produce a field (hereinafter referred to as the poloidal field) that serves to shape and stabilise the plasma.

The tokamak 1 includes a central solenoid 5. The central solenoid 5 extends vertically through the hole in the centre of the set of TF coils 3. The central solenoid 5 is made using $Nb_3Sn$. During operation, the central solenoid 5 produces a time-varying field which serves to induce a current in the plasma, thereby helping to heat the plasma.

A large number of other components of the tokamak 1 are not shown in the figures. For example, the tokamak 1 includes superconducting correction coils, support structures, cryogenic systems, electrical power systems, and so forth.

Further details of the tokamak 1 are provided in, for example, M. Huguet, "Key engineering features of the ITER-FEAT magnet system and implications for the R&D programme", Nuclear Fusion, vol. 41, p. 1503, 2011, and N. Mitchell et al., "The ITER Magnet System", IEEE Transactions on Applied Superconductivity, vol. 18, p. 435, 2008.

A Drawback of the Known Tokamak

A drawback of such a tokamak 1 is that the TF coils 3 and the vacuum vessel 2 are interlinked such that if, for example, one of the TF coils 3 develops a fault, it cannot readily be replaced and, in particular, not without at least partly disassembling the vacuum vessel 2.

Demountable Joints

One way of addressing the abovedescribed drawback is to use a TF coil 3 that has demountable joints. A demountable joint is a joint that, for example, can be broken and re-made without significantly negatively affecting the performance of the conductors that are connected by the joint.

As explained, for example, in Y. Tsui et al, "Soldered joints—an essential component of demountable high temperature superconducting fusion magnets", Superconductor Science and Technology, vol. 29, p. 075005, 2016, demountable joints will: eliminate the single point failure of a monolithic TF coil structure; enable the modular construction of very large complex superconducting magnets;

improve reactor maintenance by improving access; increase the availability of a fusion reactor; and enable simplified materials component testing.

Z. S. Hartwig et al, "An initial study of demountable high-temperature superconducting toroidal field magnets for the Vulcan tokamak conceptual design", Fusion Engineering and Design, vol. 87, p. 201, 2012 describes initial assessments of the engineering challenges and cryogenic-dependent cost and parameters of a demountable, high-temperature superconducting (HTS) TF magnet system have been carried out using a Vulcan tokamak conceptual design (major radius R=1.2 m, minor radius a=0.3 m, on-axis magnetic field $B_0$=7 T) as a baseline. Jointed at the midplane to allow vertical removal of the primary vacuum vessel and routine maintenance of core components, structural D-shaped steel support cases provide cryogenic cooling for internally routed yttrium barium copper oxide (YBCO) superconducting cables.

B. N. Sorbom et al, "ARC: A compact, high-field, fusion nuclear science facility and demonstration power plant with demountable magnets", Fusion Engineering and Design, vol. 100, p. 378, 2015, describe ARC, a 200-250 MWe tokamak reactor with a major radius of 3.3 m, a minor radius of 1.1 m, and an on-axis magnetic field of 9.2 T. ARC has rare earth barium copper oxide (REBCO) superconducting toroidal field coils, which have joints to enable disassembly. The joints are located at the outer midplane and the top of the coils. Also described is a "picture frame" TF coil arrangement, which represents a possible magnet configuration wherein joints on all four corners of the magnets are demountable.

SUMMARY

According to an aspect of the present invention, there is provided a superconducting magnet for producing part of a substantially toroidal field in a device, the magnet comprising:
  a set of conductors comprising one or more first conductors and one or more second conductors; and
  a set of joints, each of the joints connecting a region of a first conductor with a region of a second conductor to form a series of alternating first and second conductors corresponding to at least part of a winding of the magnet;
  wherein each of the joints is positioned away from a midplane of the toroidal field, the joints are positioned on alternating sides of the midplane, and each first conductor passes through the midplane at a smaller distance from an axis of rotation of the toroidal field than does each second conductor; and
  wherein each of the regions is elongate and extends in a direction at least partly away from the midplane.

Thus, the magnet has a configuration which may have various advantages. For example, the joints may be positioned in relatively low field regions.

The joint itself may extend to lower-field regions and may have a larger surface area, both of which may reduce the resistance of the joint. Furthermore, the available space in the magnet may be used effectively.

The device may be a tokamak, and is generally referred to herein as "the tokamak". However, the magnet may be used in another type of device. The magnet may be used to produce different fields (e.g. straight, cylindrical fields), although the magnet may not then have some of the advantages described herein.

At least one first conductor or at least one second conductor may comprise at least one elongate part that extends in a substantially straight line. Thus, the magnet may include conductors that are preferably straight (e.g. conductors that are damaged by bending).

At least one first conductor or at least one second conductor may comprise consecutive first, second and third elongate parts. The first and third parts may extend along line segments of a substantially straight line. The second part may extend along a substantially curved path.

Accordingly, the magnet may have a so-called half-Φ shape (see, for example, FIG. 6B). Such a magnet may have some or all of the advantages described herein. Furthermore, such a magnet may be particularly suitable for use in a tokamak because its inner surface may substantially conform to an outer surface of a D-shaped vacuum vessel of the tokamak.

The shapes of the first and/or second conductors may also be tailored to produce favourable operating stresses/strains in the conductor. Furthermore, for a superconductor with a critical current that depends upon a relative orientation of a crystal structure of the superconductor and the field, a favourable orientation of the superconductor relative to the operating field may be achieved with a suitable, tailored shape.

For at least one of the set of joints, under a set of operating conditions, the joint and/or the region of the first conductor that is connected by the joint and/or the region of the second conductor that is connected by the joint may comprise solder that is to occupy a region of the device where a maximum operating field is less than an upper critical magnetic field of the solder. Accordingly, the solder may be superconducting, thereby reducing (electrical) resistance of the joint and hence ohmic heating at the joint. This, in turn, may reduce cooling requirements, thermal instabilities, etc.

For at least one of the set of joints, the first and second conductors that are connected by the joint may each be elongate and may each comprise at least one part that extends in a direction at least partly away from the midplane. Thus, the conductors may extend to regions that are further away from the midplane, where the operating field is generally lower and where, as explained above, joints may be advantageously positioned. Furthermore, the critical currents of the conductors may be higher at such lower operating fields, which may further reduce the resistance at the joint.

The parts of the first and second conductors may be positioned substantially side-by-side. Thus, the shape need not unduly increase a magnetic field energy.

For at least one of the set of joints, the region of the first conductor that is connected by the joint may be at or near an end of the first conductor. The end of the first conductor may be at or near a furthest extent of the first conductor from the midplane. Alternatively or additionally, the region of the second conductor that is connected by the joint may be at or near an end of the second conductor. The end of the second conductor may be at or near a furthest extent of the second conductor from the midplane. Thus, for a given shape of conductor, the joint is positioned at or near a maximum distance from the midplane, and hence advantageously in a minimum or near minimum operating field.

For at least one of the set of joints, the region of the first conductor that is connected by the joint may comprise a first surface and the region of the second conductor that is connected by the joint may comprise a second, conforming surface. Thus, a low-resistance and/or a strong connection between the two regions may be obtained.

At least one of the set of joints may be a praying hand joint. Such joints may be particularly suitable for use with some of the arrangements of conductors described herein.

At least one of the set of joints may be demountable.

The second conductors may be of a different type to the first conductors.

Thus, the first and second conductors may be tailored (e.g. have properties that are particularly suitable) for the different conditions in "central" regions at smaller distances from the axis and/or from the midplane, compared to "outer" regions at larger distances from the axis and/or from the midplane. The different conditions may include operating fields, stresses, radiation, available space, etc.

At least one first conductor may comprise a first superconductor, and at least one second conductor may comprise a second, different superconductor. Thus, different properties (e.g. critical current, upper critical field, critical temperature) of different superconductors may be taken advantage of.

According to a further aspect of the present invention, there is provided a superconducting magnet for producing part of a substantially toroidal field in a device, the magnet comprising:
  one or more first conductors, each first conductor comprising a first superconductor; and
  one or more second conductors, each second conductor comprising a second, different superconductor;
  wherein each first conductor passes through a midplane of the toroidal field at a smaller distance from an axis of rotation of the toroidal field than does each second conductor.

Thus, again, the first and second conductors may be tailored for the different conditions in the central and outer regions, respectively, and, in particular, different properties (e.g. critical current, upper critical field, critical temperature) of different superconductors may be taken advantage of.

The magnet may further comprise a set of joints. Each of the joints may connect a region of a first conductor with a region of a second conductor to form a series of alternating first and second conductors corresponding to at least part of a winding of the magnet. Each of the joints may be positioned away from the midplane, and the joints may be positioned on alternating sides of the midplane.

Each of the regions may be elongate and may extend in a direction at least partly away from the midplane.

The magnet may comprise a set of joints, each of the joints indirectly connecting a first conductor and a second conductor to form a series of conductors corresponding to at least part of a winding of the magnet and comprising alternating first and second conductors. The winding may comprise further conductors (and further joints) between the first and second conductors.

In other words, the magnet may further comprise a set of further conductors and a set of joints. Each of the joints may connect two of the conductors (e.g. a first conductor and a second conductor, a first conductor and a further conductor, a second conductor and a further conductor, or two further conductors) to form a series of conductors. The series of conductors may correspond to at least part of a winding of the magnet in which the first and second conductors occur alternately.

One of the first and second superconductors may be a high-temperature superconductor (HTS), and the other of the first and second superconductors may be a low-temperature superconductor (LTS). Thus, the properties may be significantly different.

The first and second conductors may comprise the same superconductor. The first and second conductors may have different sizes, different shapes, different non-superconducting components, etc. The first and second conductors may have different versions of the same superconductor. Conductors of the same type may not be exactly the same. At least some of the set of conductors may have different shapes and/or properties according to their order in the series. That said, any differences between conductors of the same type are generally less than differences between conductors of different types.

Under a set of operating conditions (including operating temperature(s), operating stresses, etc.), at least one first conductor may have a first critical current at a first field, and at least one second conductor may have a second critical current at a second, lower field. The first and second fields may correspond to maximum operating fields in regions of the device to be occupied by the first and second conductors, respectively. The first and second critical currents may exceed the operating current by first and second margins, respectively. The critical current is the maximum current that a superconductor can carry with (practically) zero resistance.

The operating field is generally higher in more central regions, which are occupied by first conductors, than in more outer regions, which are occupied by second conductors. The first and second conductors may be optimised for use in the relevant fields. In particular, the first and second conductors may be selected such that they can just safely (i.e. with appropriate margin (s)) carry the operating current with zero resistance in the relevant fields.

The operating field may be produced by the magnet (carrying the operating current) and other magnets (e.g. other toroidal field coils, a central solenoid), etc. The operating field may be time-varying, in which case its highest value (over time) is relevant herein.

Because first conductors have to carry the operating current with zero resistance in higher fields, they are generally higher cost than second conductors. By not having the first conductor throughout, the magnet may be able to produce a particular operating field at a lower cost than a conventional (one-part) magnet.

Under a set of operating conditions, at least one first conductor may comprise a superconductor with an upper critical field corresponding to a first value, and at least one second conductor may comprise a superconductor with an upper critical field corresponding to a second value. The first value may be higher than the second value. The upper critical field is the highest field in which a (type-II) superconductor remains superconducting and, thus, indicates suitability of a superconductor for use in a particular field.

At least one first conductor and at least one second conductor may have different operating temperatures. Thus, there is a greater choice of superconductors which may be used in the magnet. This may enable an improved magnet to be produced, even though cooling the magnet may be more complex.

Any decrease in performance (e.g. critical current) caused by radiation may be less for at least one first conductor than for at least one second conductor. Radiation emitted by a plasma in a tokamak is generally more intense in central regions than in outer regions. Thus, by having a conductor that is less prone to radiation damage in a central region only, the operating/service lifetime of the magnet may be increased without unduly increasing its cost.

The winding may comprise an integer or non-integer number of turns, N, which may be around 100 or more or less.

Each of the set of conductors may correspond to ¼-¾ of a turn, preferably ~½ of a turn.

There may be, on average, two of the set of conductors (e.g. one first conductor and one second conductor) and two of the set of joints per turn. The first and last turns may be different. Accordingly, the magnet may have ~2N conductors (e.g. ~N first conductors and ~N second conductors) and ~2N joints.

The magnet may be configured for use in a spherical tokamak, for which it is particularly suited.

The magnet may be demountable, e.g. readily removed from, and readily re-assembled around, a toroidal vacuum vessel. This may require all of the joints to be demountable.

The magnet may comprise:
one or more first units, each first unit comprising at least some of the first conductors; and
one or more second units, each second unit comprising at least some of the second conductors.

The units may correspond to legs of the magnet, in which case the magnet may comprise only one first unit and only one second unit.

The units may correspond to parts of pancakes of the magnet, in which case the magnet may comprise one or more pairs of first and second units, each pair corresponding to a pancake. The joints connecting conductors in the same pancake may be different from those connecting conductors in different pancakes.

According to a further aspect of the present invention, there is provided a first unit and/or a second unit of the abovedescribed magnet. Such a unit may be supplied separately.

There may be provided a tokamak comprising a plurality of the abovedescribed magnets and a toroidal vacuum vessel for a plasma.

According to a further aspect of the present invention, there is provided a method of constructing the abovedescribed tokamak, the method comprising:
providing at least part of the vacuum vessel; and then
arranging the conductors around the vacuum vessel; and
making the set of joints.

Thus, the magnet may be assembled around the toroidal vacuum vessel, thereby facilitating manufacture of the tokamak.

According to a further aspect of the present invention, there is provided a method of operating the abovedescribed tokamak, the method comprising:
determining that at least part of a magnet is to be replaced;
demounting at least one of the set of joints;
replacing the part of the magnet; and
making at least one of the set of joints.

Thus, the magnet or the part of the magnet may be fully or partly demountable, that is to say replaceable without, for example, disassembling the toroidal vacuum vessel. This may facilitate servicing and repair of the tokamak.

The determining may comprise determining that an operating or service lifetime has ended. Thus, the risk of magnet failures may be reduced.

The method may comprise replacing each of the first conductors (which may be subject to more intense radiation) more frequently than each of the second conductors. Thus, the effects of radiation may be effectively and efficiently managed.

BRIEF DESCRIPTION OF THE DRAWINGS

Certain embodiments of the present invention will now be described, by way of example, with reference to the accompanying drawings, in which.

DETAILED DESCRIPTION OF THE CERTAIN EMBODIMENTS

Superconducting Magnet

Figure 6A:
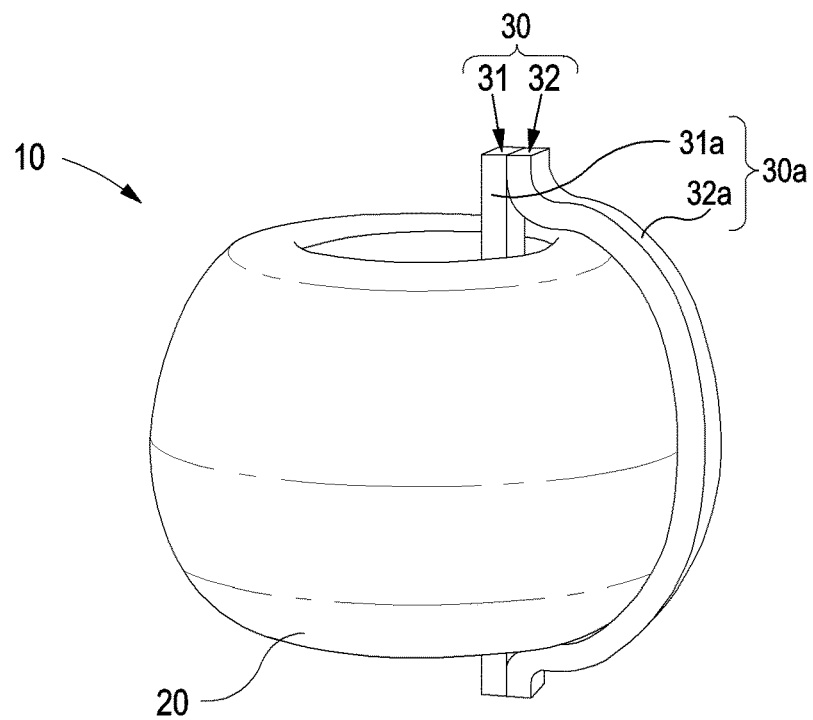
FIG. 6A illustrates a vacuum vessel and one of the magnets of a further tokamak.
Figure 6B:
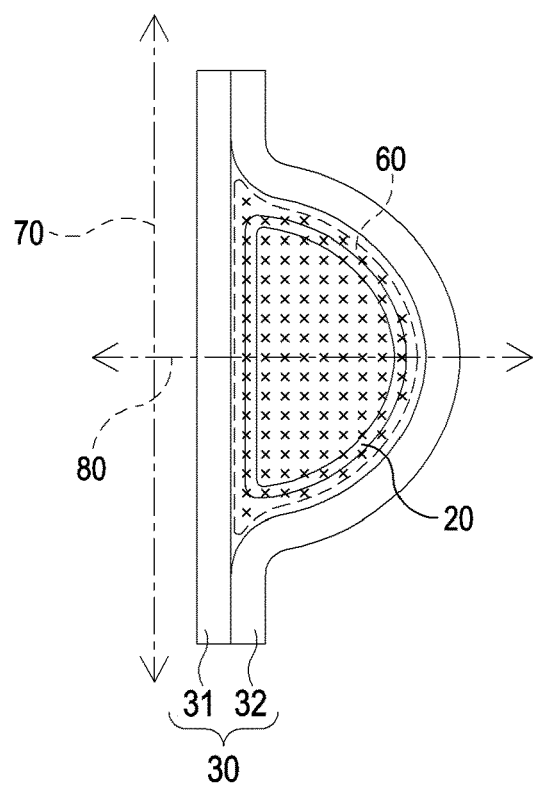
FIG. 6B illustrates, by way of a radial sectional view, the vacuum vessel and the magnet illustrated in FIG. 6B.
Figure 6C:
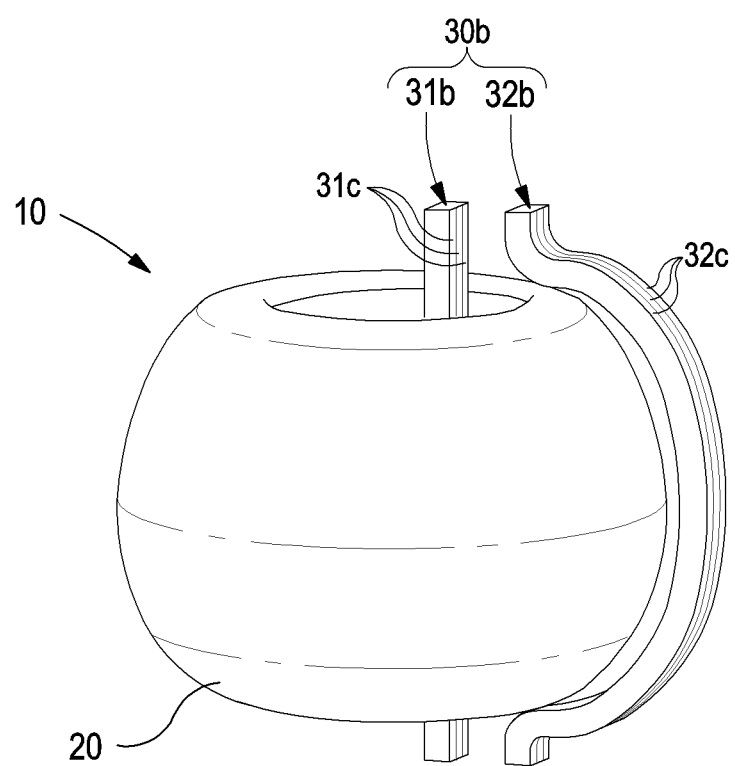
FIG. 6C illustrates the vacuum vessel and the magnet illustrated in FIG. 6A during demounting.
Figure 7:
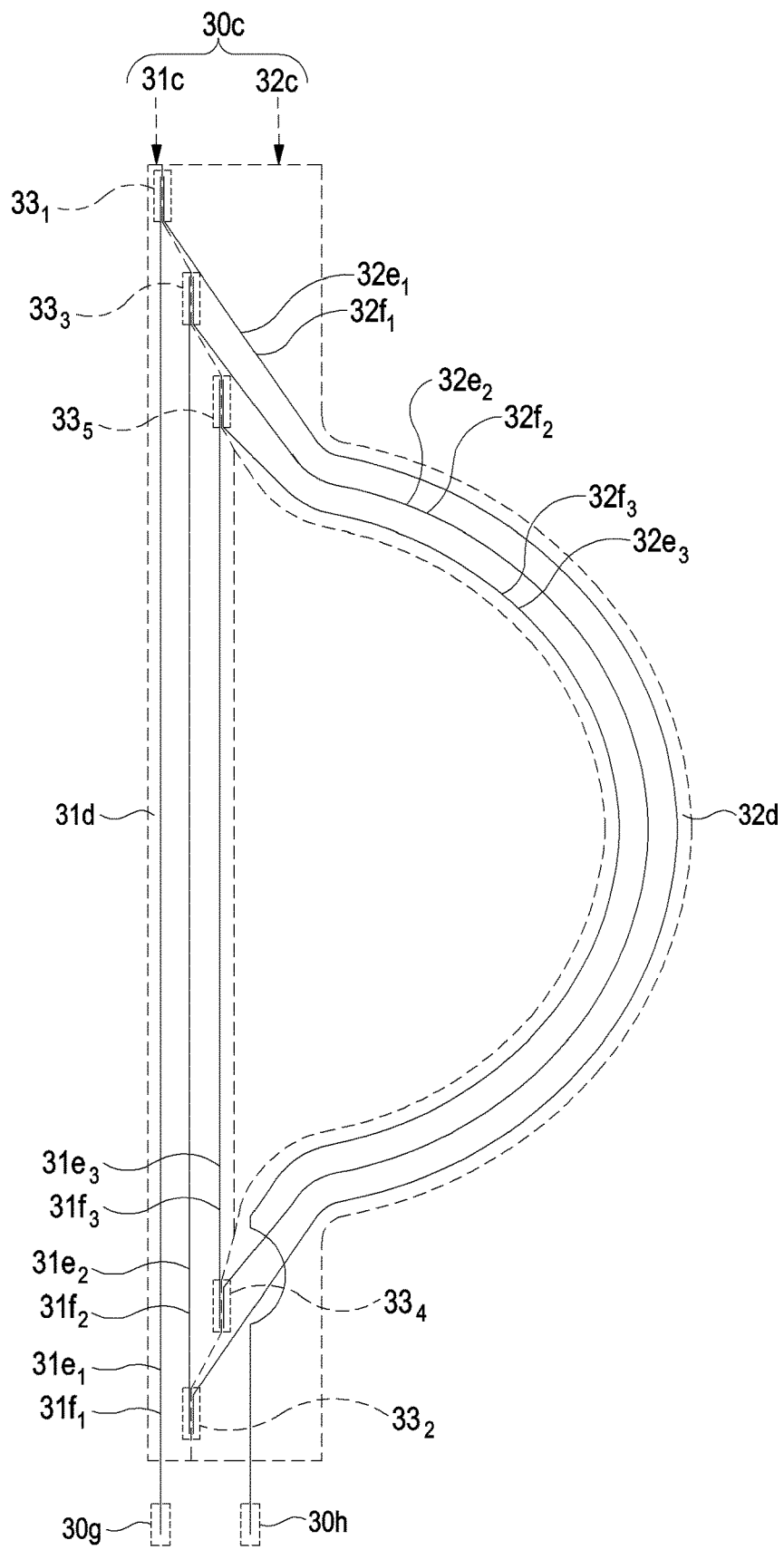
FIG. 7 illustrates a pancake of the magnet illustrated in FIG. 6A.

Referring to FIGS. 6-7, a (superconducting) magnet 30 will now be described. The magnet 30 corresponds to a TF coil 30 of a "first" tokamak 10.

Except for the magnets 30 and some related components, the first tokamak 10 may have the same components as the abovedescribed "known" tokamak 1. In particular, the first tokamak 10 may include a vacuum vessel 20, PF coils (not shown) and a central solenoid (not shown) which are the same as the vacuum vessel 2, PF coils 4 and central solenoid 5 of the known tokamak 1, respectively.

The first tokamak 10 includes a plurality of magnets, each of which may be substantially the same as the magnet 30 illustrated in FIGS. 6A-C and described below.

The magnet 30 has a "half-Φ" shape, which corresponds to a "D" shape with an extended upright of the D. The region enclosed by the half-Φ shape is broadly D-shaped. The magnet 30 encircles a section of the toroidal vacuum vessel 20. During operation, the magnet 30 produces part of a toroidal field 60. The toroidal field 60 has a toroidal shape with a cross-section that approximately corresponds to the region enclosed by the magnet 30. The toroidal field 60 has a (substantially vertical) main axis 70 and a (substantially horizontal) midplane 80, which are defined in the same way as in the known tokamak 1. The toroidal field 60 has substantially circular field lines circulating around the main axis 70.

The magnet 30 comprises two parts 31, 32 (hereinafter referred to as inner and outer legs). Referring in particular to FIG. 6C, the parts 31 are separable, making the magnet 30 demountable, as will be explained below. The inner leg 31 is elongate and extends in a substantially straight line in a direction parallel with the main axis 70. The inner leg 31 passes through the hole in the toroidal vacuum vessel 20. The outer leg 32 is elongate and extends along a curved path. An uppermost part of the outer leg 32 is substantially parallel with, and positioned side-by-side with, an uppermost part of the inner leg 31. A lowermost part of the outer leg 32 is substantially parallel with, and positioned side-by-side with, a lowermost part of the inner leg 31. The remaining part of the outer leg 32 is approximately D-shaped, except that it curves smoothly towards each of the uppermost and lowermost parts. The outer leg 32 passes around the outside of the vacuum vessel 20.

Accordingly, the outer leg 32 is generally further from the main axis 70 and/or from the midplane 80 (i.e. less central) than the inner leg 32. The toroidal field 60 generally decreases with increasing distance from the main axis 70 and with increasing distance from the midplane 80. Accordingly, the outer leg 32 is generally subject to lower (operating) fields than the inner leg 31. Other fields in the tokamak (in particular the field produced by the central solenoid, which is the highest of the other fields) may vary in an equivalent way and so emphasise this difference.

Referring in particular to FIG. 6A, the magnet 30 includes a shell 30a, which may be divided into "inner" and "outer" parts 31a, 32a associated with the inner and outer legs 31, 32, respectively.

Referring in particular to FIG. 6C (in which the shell 30a has been removed), the inner leg 31 includes an "inner" part 31b of a winding pack 30b of the magnet 30, and the outer leg 32 includes an "outer" part of the winding pack 30b. In particular, the inner leg 31 includes a number of one or more "inner" pancake parts 31c, and the outer leg 32 includes the same number of "outer" pancake parts 32c. Each inner pancake part 31c pairs with a corresponding outer pancake part 32c to form a pancake 30c.

Referring in particular to FIG. 7, one of the pancakes 30c will now be described.

The inner pancake part 31c includes an "inner" plate 31c, and the outer pancake part 32c includes an "outer" plate 32d. The inner plate 31d has a similar shape to the inner leg 31, and the outer plate 32d has a similar shape to the outer leg 32, except that the uppermost and lowermost parts of the inner and outer plates 31d, 32d have a more complex shape, which will be described below.

The inner and outer plates 31d, 32d may abut each other, and may be releasable connected to each other in any suitable way.

The pancake 30a is a single pancake. Alternatively, the pancake 30a may be a double pancake or another type of pancake. The inner plate 31d has a set of grooves 31e (hereinafter referred to as inner grooves) on one of its major surfaces, and the outer plate 32d has a set of grooves 32e (hereinafter referred to as outer grooves) on the equivalently orientated one of its major surfaces.

Figure 1:
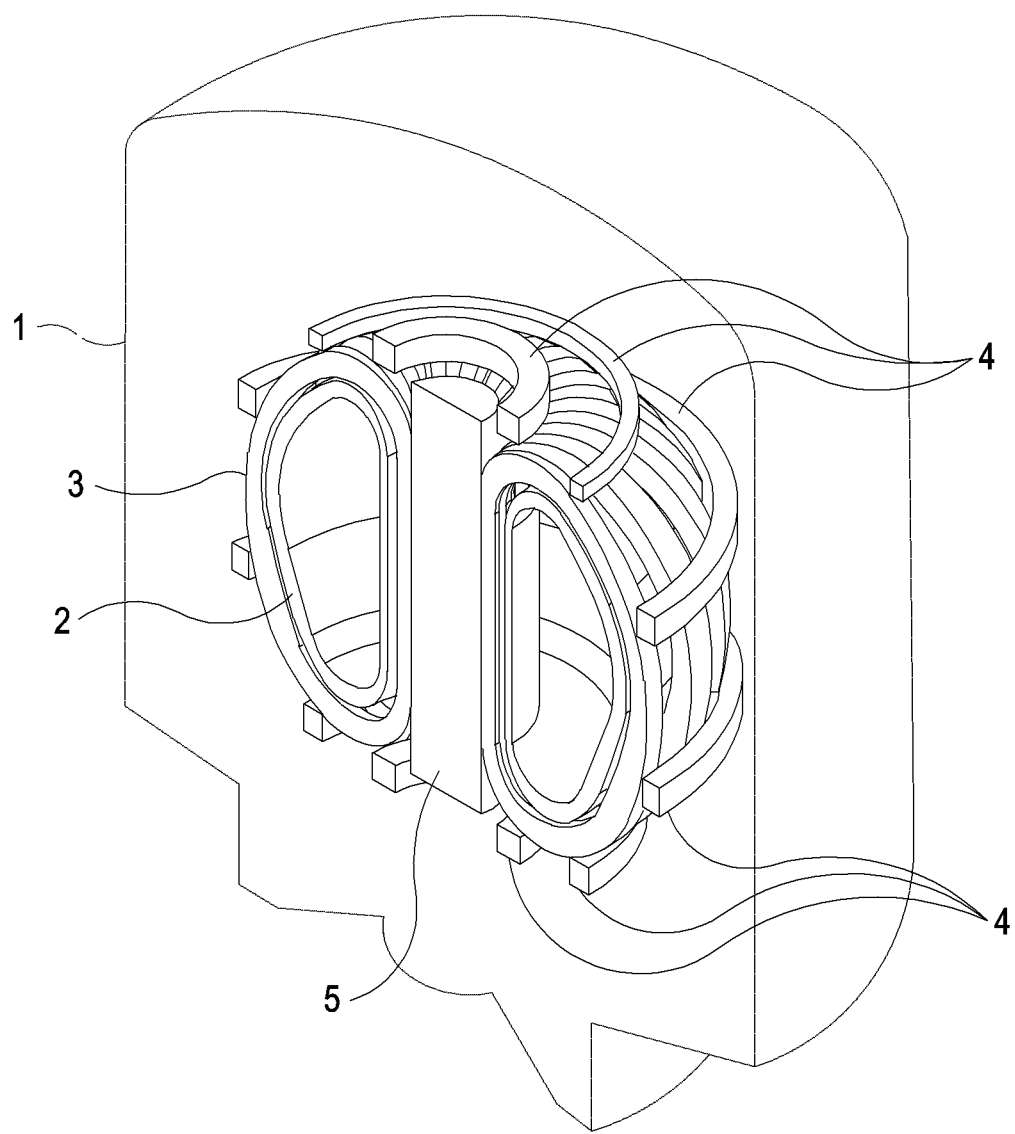
FIG. 1 illustrates, by way of a cutaway view, a known design of a tokamak.
Figure 2A:
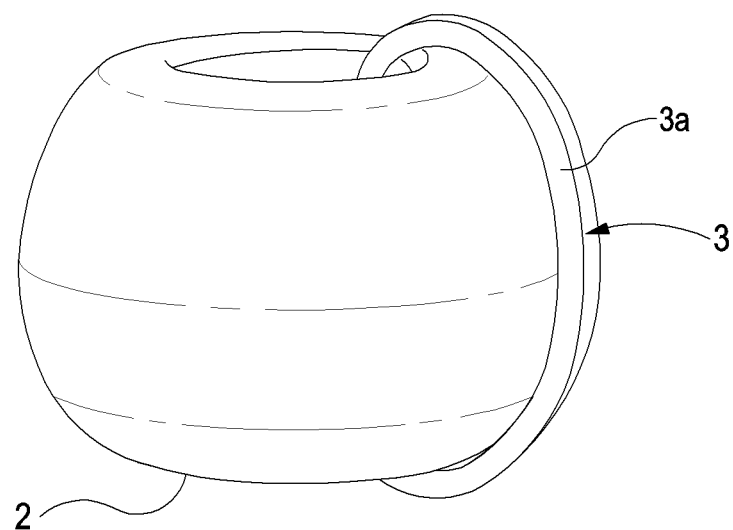
FIG. 2A illustrates a vacuum vessel and one of the toroidal field coils of the tokamak illustrated in FIG. 1.
Figure 2B:
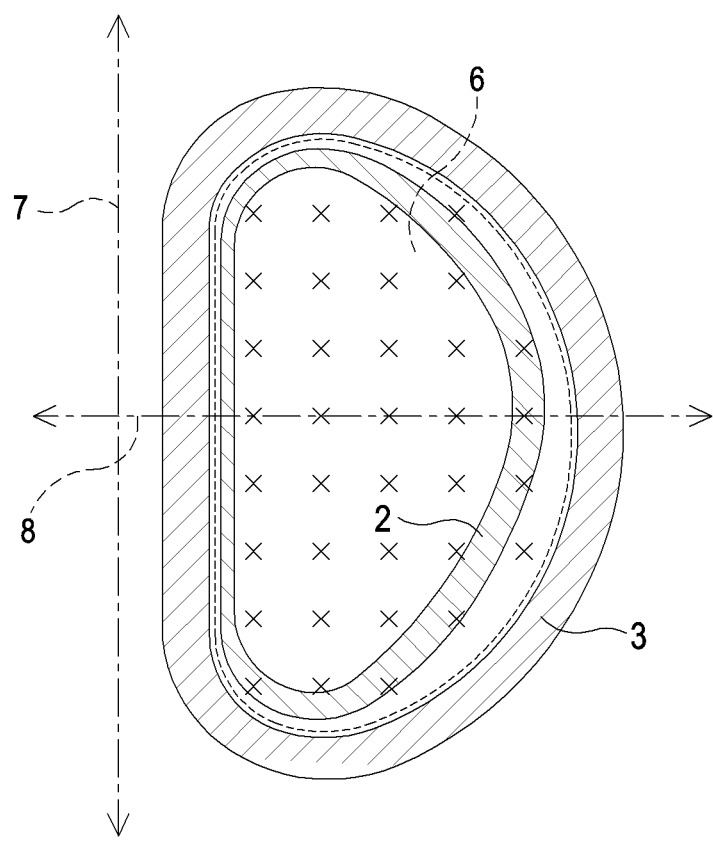
FIG. 2B illustrates, by way of a radial sectional view, the vacuum vessel and the toroidal field coil illustrated in FIG. 2A.
Figure 3A:
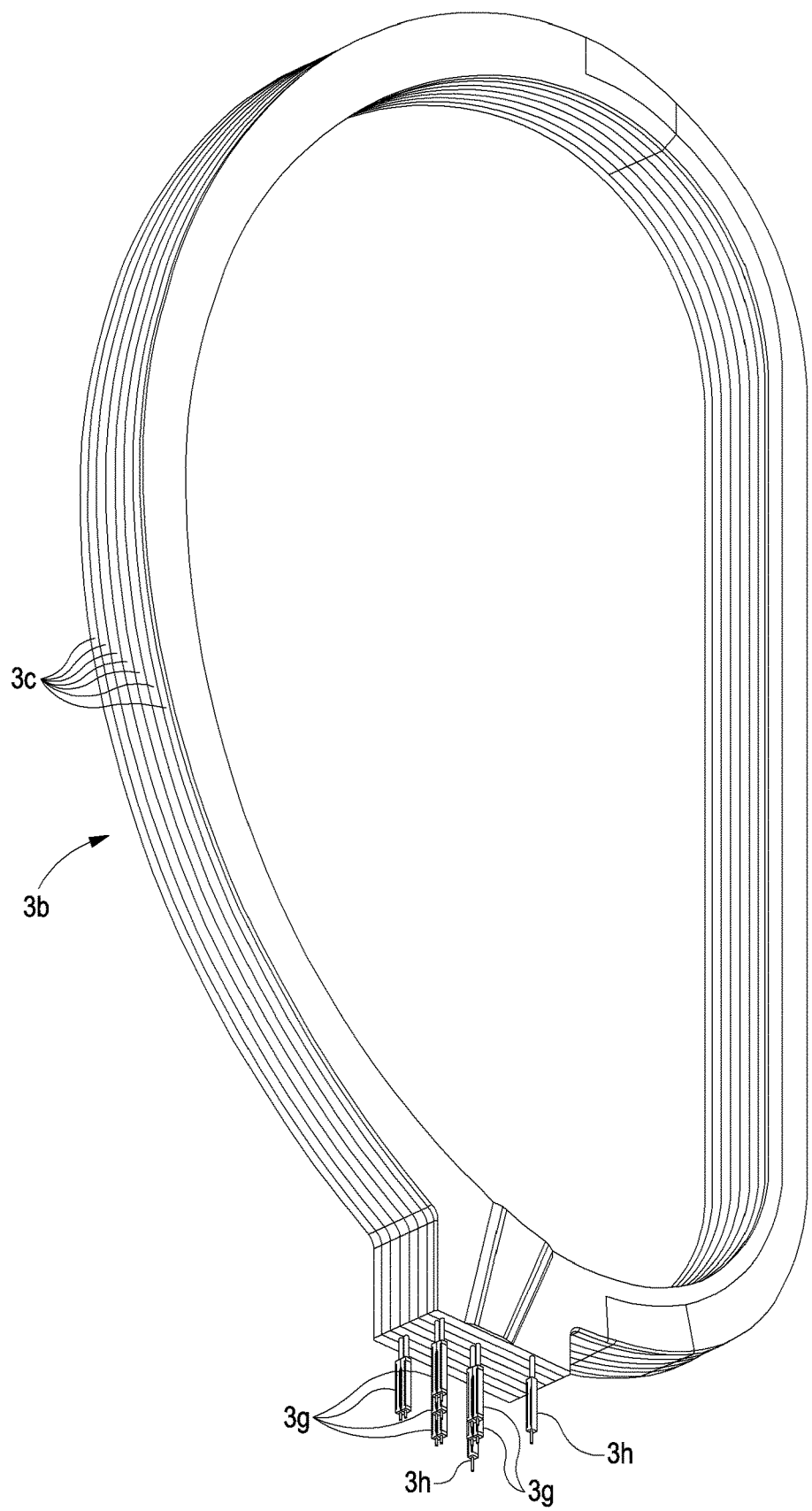
FIG. 3A illustrates a winding pack and joints of the toroidal field coil of the tokamak illustrated in FIG. 1.
Figure 3B:
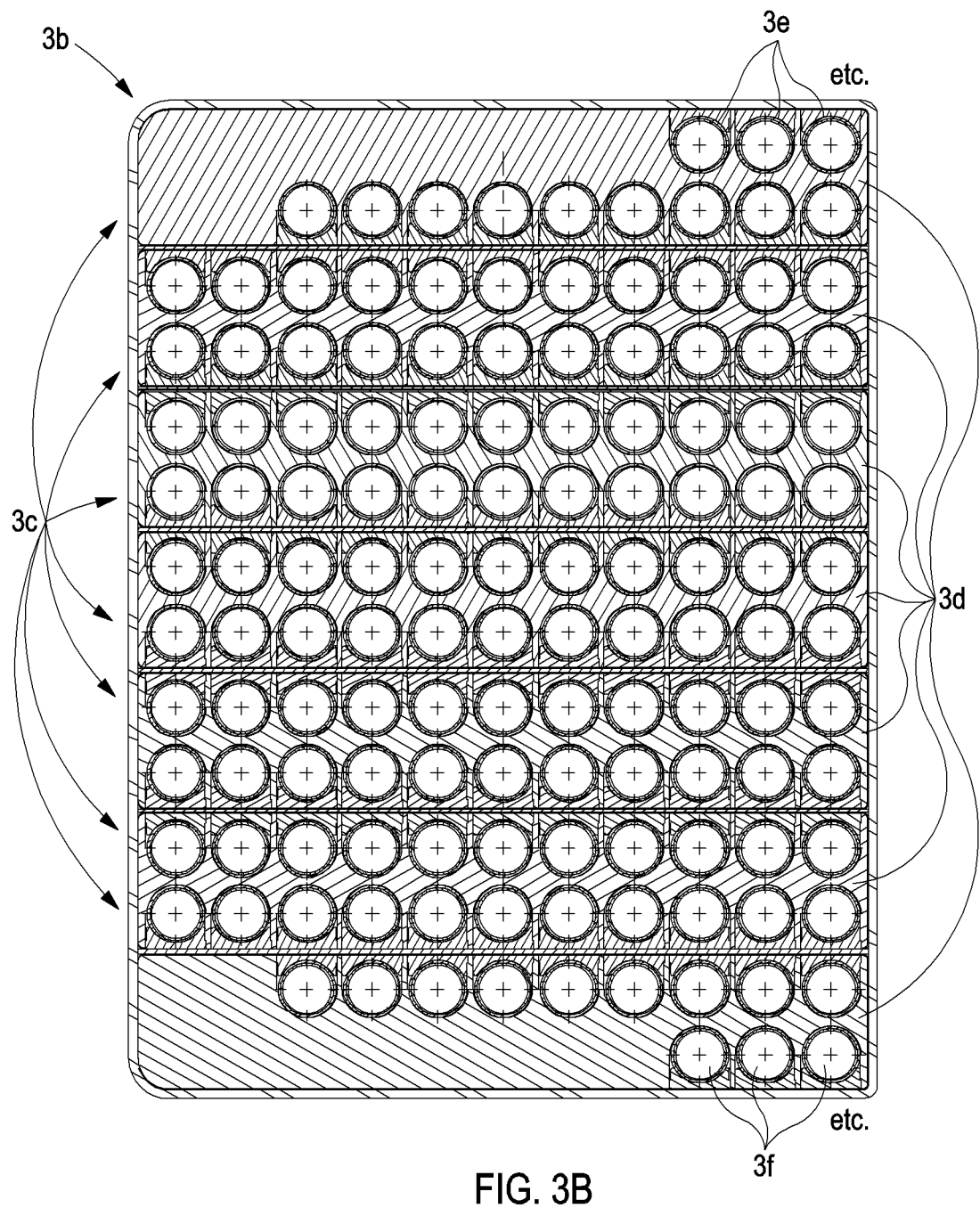
FIG. 3B illustrates a cross-section of the winding pack illustrated in FIG. 3A.
Figure 3C:
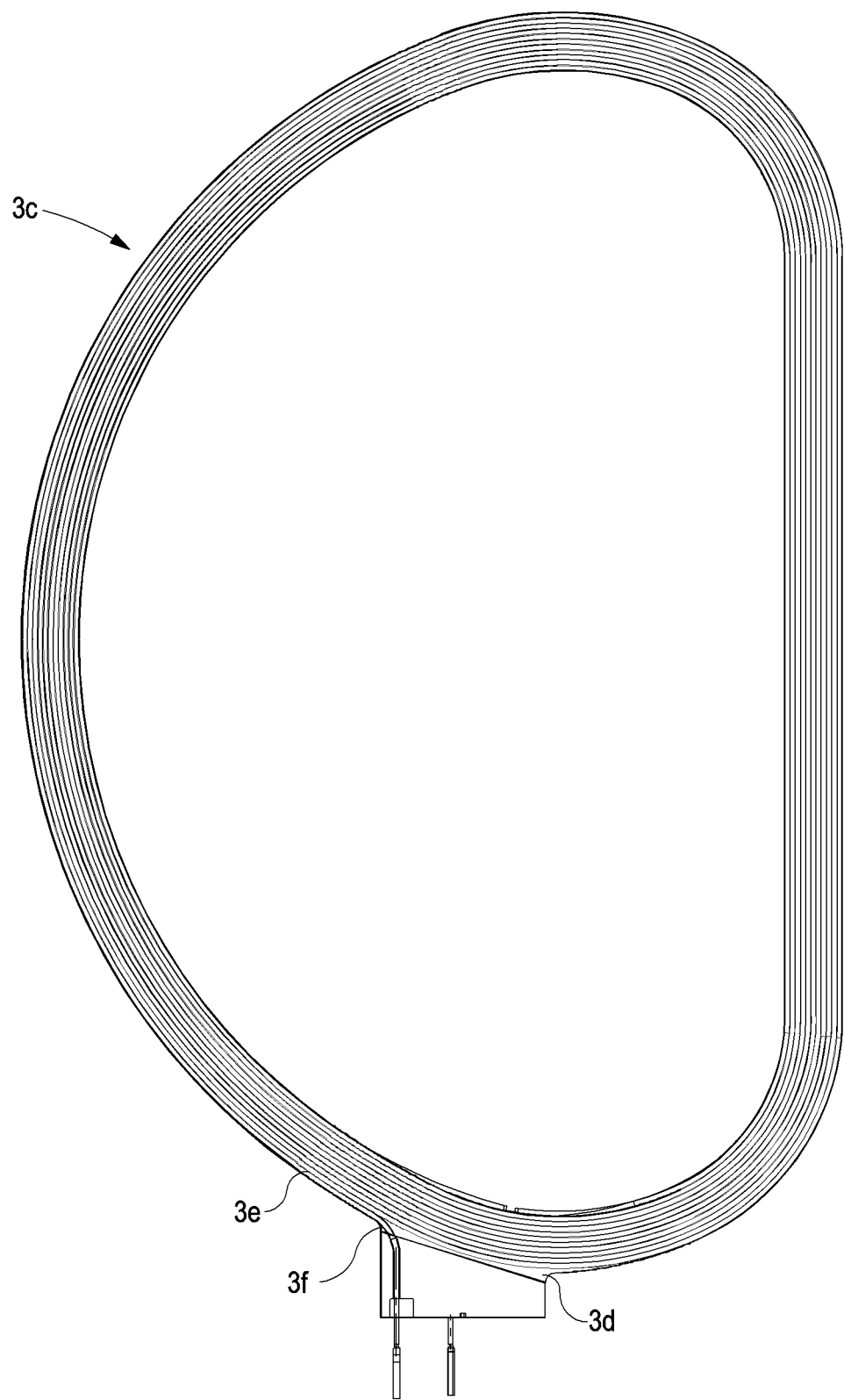
FIG. 3C illustrates a double pancake of the winding pack illustrated in FIG. 3A.
Figure 4:
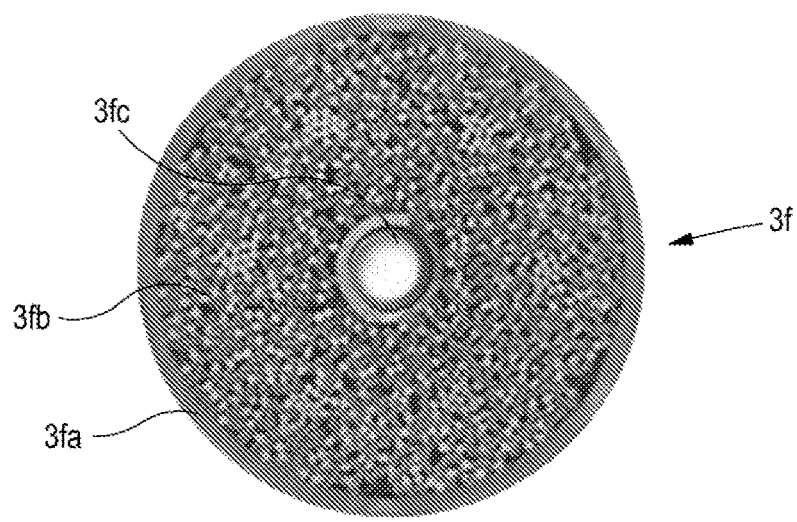
FIG. 4 shows a cross-section of a cable-in-conduit conductor that may be used in the toroidal field coil of the tokamak illustrated in FIG. 1.

A conductor 31f (hereinafter referred to as an inner conductor) is arranged in each of the inner grooves 31e, and a conductor 32f (hereinafter referred to as an outer conductor) is arranged in each of the outer grooves 32e. The inner conductors 31f may be substantially the same as the outer conductors 32f, and each of the inner and outer conductors 31f, 32f may be substantially the same as the conductor 3f shown in FIG. 4. Alternatively, the inner conductors 31f may be different from the outer conductors 32f, as will be explained below.

Only three inner conductors $31f_1$, $31f_2$, $31f_3$ and three outer conductors $32f_1$, $32f_2$, $32f_3$ are shown in the figure. However, there may be any number of inner and outer conductors 31f, 32f.

The inner conductors 31f meet the outer conductors 32f at joints 33 (hereinafter referred to as intra-pancake joints), which will be described below.

The conductors 31f, 32f together form a distorted (half-Φ) spiral. The spiral may be left- or right-handed Each inner conductor 31f follows a straight path. Each outer conductor 32f follows a path that approximately corresponds to the shape of the outer plate 32d, except that the uppermost and lowermost parts of each of the outer conductors 32f follow a more complex path, which will be described below.

Intra-pancake joint(s) 33 associated with different inner conductors 31f are positioned at different distances from the main axis 70. This enables each inner conductor 31f to follow a straight path parallel to the main axis 70. Furthermore, intra-pancake joint(s) 33 associated with different outer conductors 32f are positioned at different distances from the midplane 80. This enables each outer conductor 32f to follow a smooth path to the relevant intra-pancake joint(s) 33, while avoiding other intra-pancake joints 33. Depending on the size of the intra-pancake joint(s) 33, the outer conductors 32f may follow paths that are splayed towards their ends.

The inner and outer plates 31d, 32d meet in the vicinity of each intra-pancake joint 33, while being shaped to carry the inner and outer conductors 31f, 32f, respectively, to/from the intra-pancake joints 33. Accordingly, as illustrated in the figure, the inner plate 31d narrows in a stepwise way towards its uppermost and lowermost ends, and the outer plate 32d widens in a complementary way.

The centremost conductor in the spiral (in this instance, the third outer conductor $32f_3$) extends in a suitable way to a suitable position for an inter-pancake joint 30g or (in this instance) a terminal joint 30h. For example, such a conductor may follow a partially raised or lowered path. In a double-pancake, such a conductor may extend through the inner and/or outer plate 31d, 32d and may correspond to (or be joined to) the centremost conductor of a similar spiral on the other major surfaces of the inner and outer plates 31d, 32d.

Each intra-pancake joint 33 forms an (electrical) connection between an inner conductor 31f and an outer conductor 32f (and is insulated from other intra-pancake joints 33).

Accordingly, the conductors 31f, 32f form part of a winding of the magnet 30. Each intra-pancake joint 33 may be formed in any suitable way. For example, each intra-pancake joint 33 may have some or all of the features of the inter-pancake joint 3g of the known tokamak 1 (see in particular FIG. 5). Such an intra-pancake joint 33 may be elongate and may be orientated substantially parallel with the main axis 70. The inner and/or outer plates 31d, 32d may have a cut-out region to at least partly accommodate each intra-pancake joint 33. The inner and/or outer plates 31d, 32d may serve to at least partly clamp each intra-pancake joint 33.

The pancake 30c illustrated in the figure, which may correspond to the first or last pancake 30c in the winding pack 30b, has (when assembled) one inter-pancake joint 30g and one terminal joint 30h.

Figure 5:
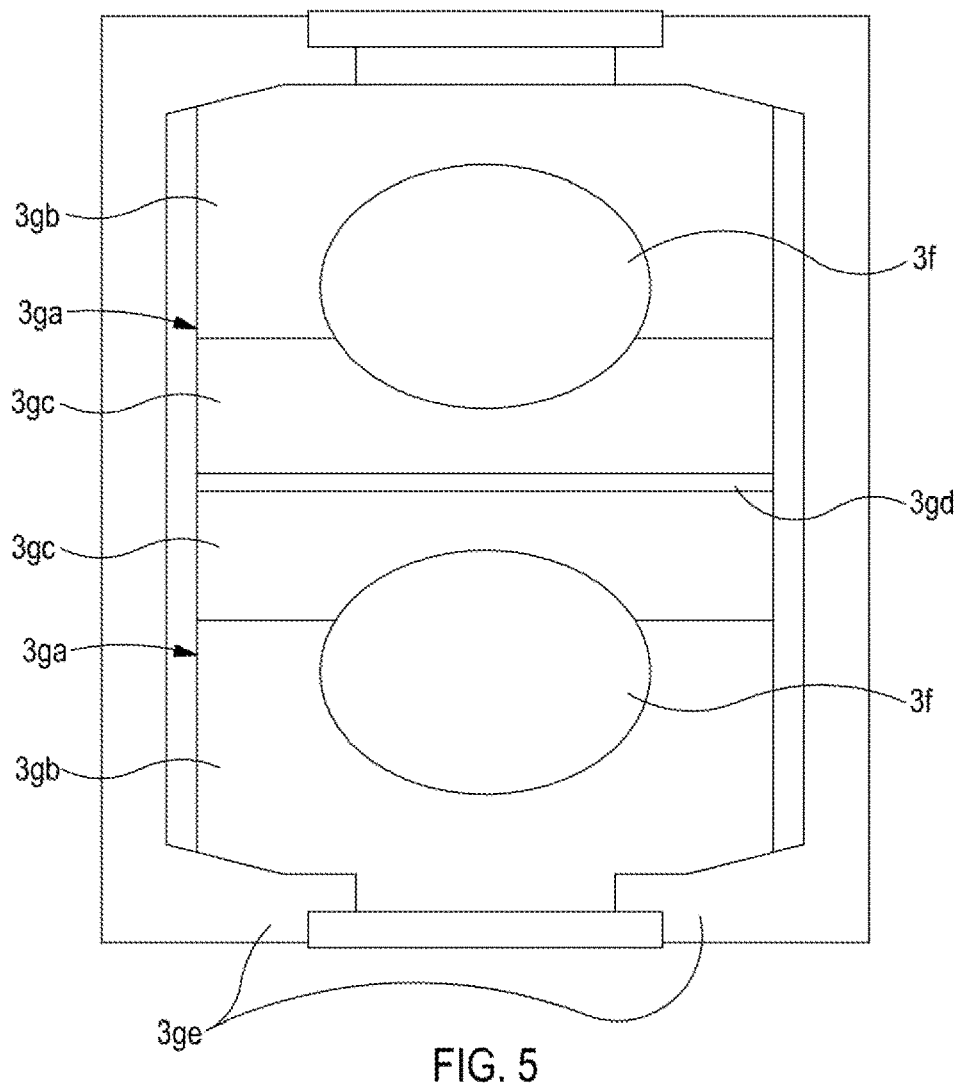
FIG. 5 illustrates, by way of a horizontal cross-sectional view, an inter-pancake joint of the winding pack illustrated in FIG. 3.

The inter-pancake joint 30g may be approximately the same as the inter-pancake joint 3g of the known tokamak 1 (see in particular FIG. 5). The inter-pancake joint 30g is for connecting a suitable conductor (in this instance, the first inner conductor 31f1) with a suitable conductor of another pancake 30c.

The terminal joint 30h may be approximately the same as the terminal joint 3h of the known tokamak 1. The terminal joint 30h is for connecting a suitable conductor (in this instance, the third outer conductor $32f_3$) with an electrical power system.

Each of the joints in the magnet 30 (i.e. each intra-pancake joint 33, each inter-pancake joint 30g and each terminal joint 30h) may include features to facilitate demounting such as releasable clamps, solder that is readily meltable, etc.

Other pancakes 30c, which may correspond to intermediate pancakes 30c in the winding pack 30b, may have two inter-pancake joints 30g, each of which is for connecting a suitable conductor of the pancake 30c with a suitable conductor of another pancake 30c.

The pancakes 30c may be connected to each other in any suitable way that maintains the same rotation of electrical current.

If the winding pack 30b includes only one pancake 30c, then the pancake 30c may include two terminal joints 30h.

The magnet 30 is demountable, which involves some or all of the joints in the magnet 30 (i.e. some of all of the intra-pancake joints 33, inter-pancake joints 30g and terminal joints 30h) being demountable.

Methods of Constructing and Operating a Tokamak

Figure 8A:
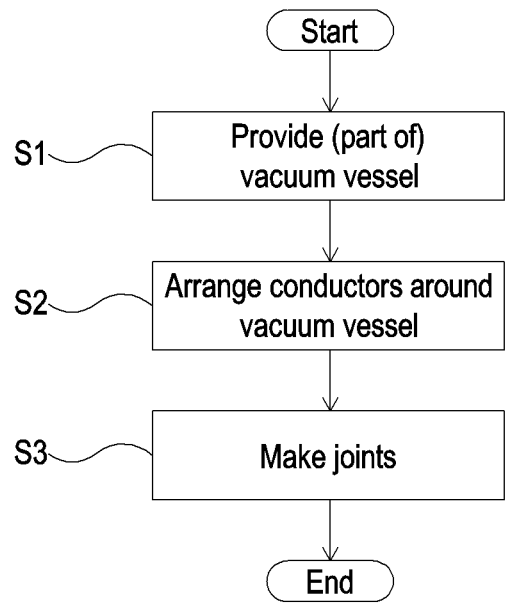
FIGS. 8A-B illustrate, by way of flow diagrams, methods of (A) constructing and (B) operating the tokamak partly illustrated in FIG. 6A.

Referring to FIG. 8A, a method of constructing the first tokamak 10 will be briefly described.

At a first step S1, at least part of the vacuum vessel 20 is provided (e.g. assembled). Several other components of the first tokamak 10 may also be provided at this stage.

At a second step S2, the inner and outer conductors 31f, 32f are arranged around the vacuum vessel 20. For example, pre-assembled inner and outer legs 31, 32 may be put in place. The second step S2 may be carried out even if the toroidal vacuum vessel 20 etc. has already been fully assembled (and without requiring its disassembly).

At a third step S3, some or all of the joints in the magnet 30 are made. This may involve, for example, soldering and/or clamping these joints.

Thereafter, various further steps may be taken to complete assembly of the magnet 30 (e.g. adding the shell 30a) and to complete construction of the first tokamak 10

Figure 8B:
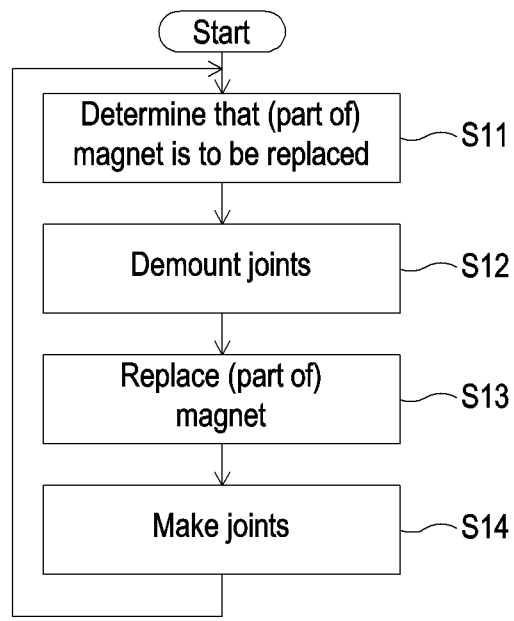

Referring to FIG. 8B, a method of operating the first tokamak 10 will be briefly described.

At a first step S11, it is determined that at least part of the magnet 30 is to be replaced. For example, it may be determined that one or both winding packs 31b, 32b, one or more pancake parts 31c, 32c, or one or more conductors 31f, 32f are to be replaced. The determination may be made in any suitable way. For example, it may be based on data from one or more sensors associated with the magnet 30. It may be that an operating/service lifetime of the magnet 30 or the part of the magnet 30 has ended.

The inner conductors 31f may be subject to more intense radiation due to their more central position. Accordingly, the inner conductors 31f will generally have shorter lifetimes and require more frequent replacing than the outer conductors 32f. This is particular so in a spherical tokamak, in which the plasma (and hence the inner conductors 31f) are particularly close to the main axis 70.

At a second step S12, relevant joints are demounted. If, for example, only one conductor (e.g. an inner conductor 31f) is to be replaced, then the relevant joints may be the two joints associated with the conductor 31f, or the joints associated with the pancake 30c in which the conductor 31f is included, or the joints associated with two or more or all of the pancakes 30c in the magnet 30. Other components of the magnet 30 (e.g. the shell 30a) and/or other components of the first tokamak 10 may be disassembled prior to demounting the relevant joints.

At a third step S13, the magnet 30 or the part of the magnet 30 is replaced. For example, the inner leg 31 may be set aside and a new inner leg 31 may be put in place, together with the original outer leg 32. The third step S13 may be carried out without requiring disassembly the toroidal vacuum vessel 20.

At a fourth step S14, the relevant joints are made. As described above, this may involve, for example, soldering and/or clamping these joints.

Thereafter, various further steps may be taken to fully re-assemble the magnet 30 (e.g. adding the shell 30a) and/or to fully re-assemble the first tokamak 10.

A Different Pancake

Figure 9:
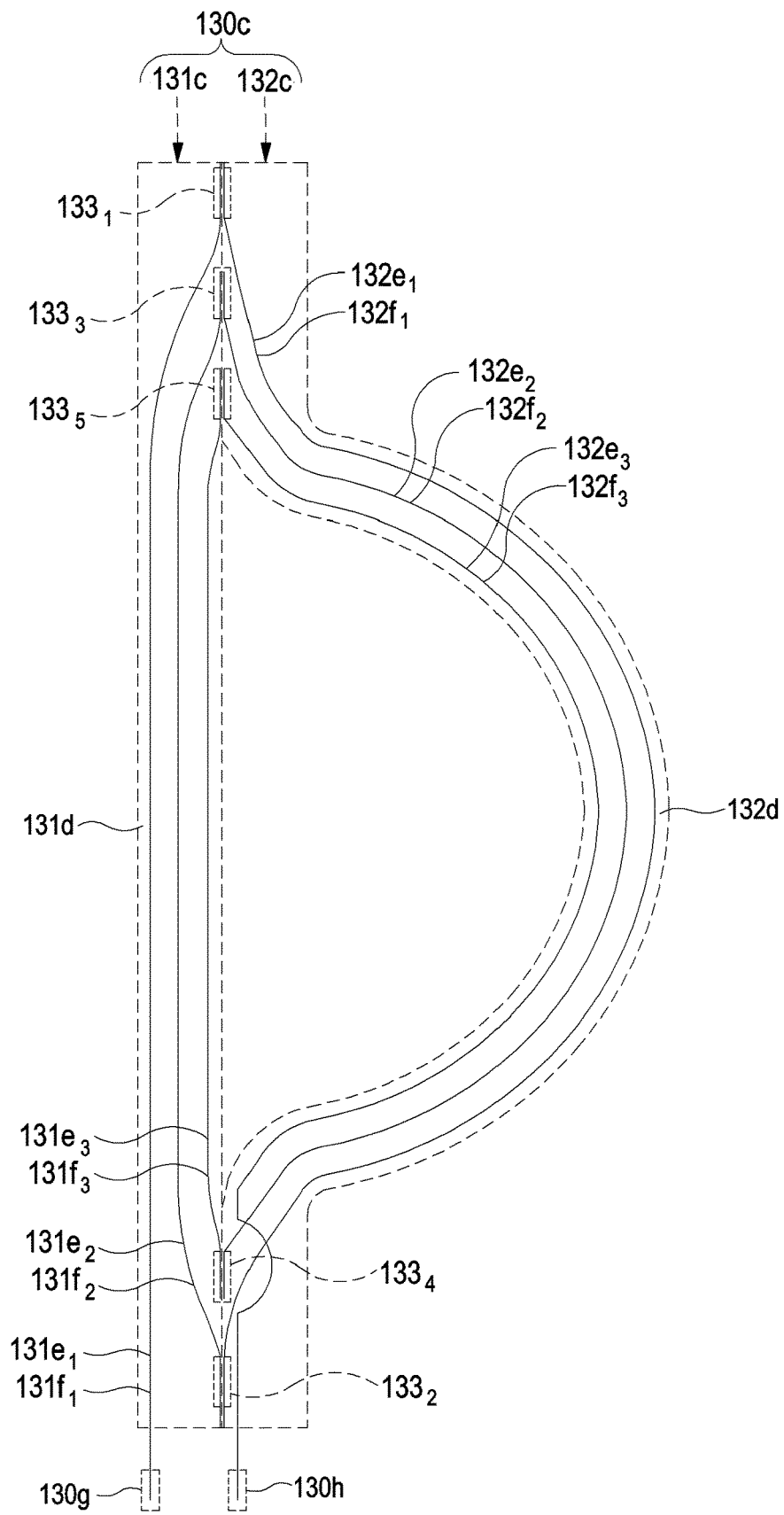
FIG. 9 illustrates a further pancake which may be used in the magnet illustrated in FIG. 6A.

Referring to FIG. 9, a different, "second" pancake 130c will now be described.

The second pancake 130c may be used in place of the first pancake 30c in the abovedescribed magnet 30. The second pancake 130c is substantially the same as the first pancake 30c except for the following:
- all of the intra-pancake joints 133 of the second pancake 130 are positioned on a line parallel with the main axis 70;
- the inner and outer plates 131d, 132d meet on this line; and
- each inner groove 131e and associated conductor 131f follows a path that curves towards one or both of its ends to the relevant intra-pancake joint(s) 133.

The second pancake 130c has a potential advantage of a simpler connection between the inner and outer pancake parts 131c, 132c, and a potential disadvantage of curved inner conductors 131f.

Different Magnets

Figure 10:
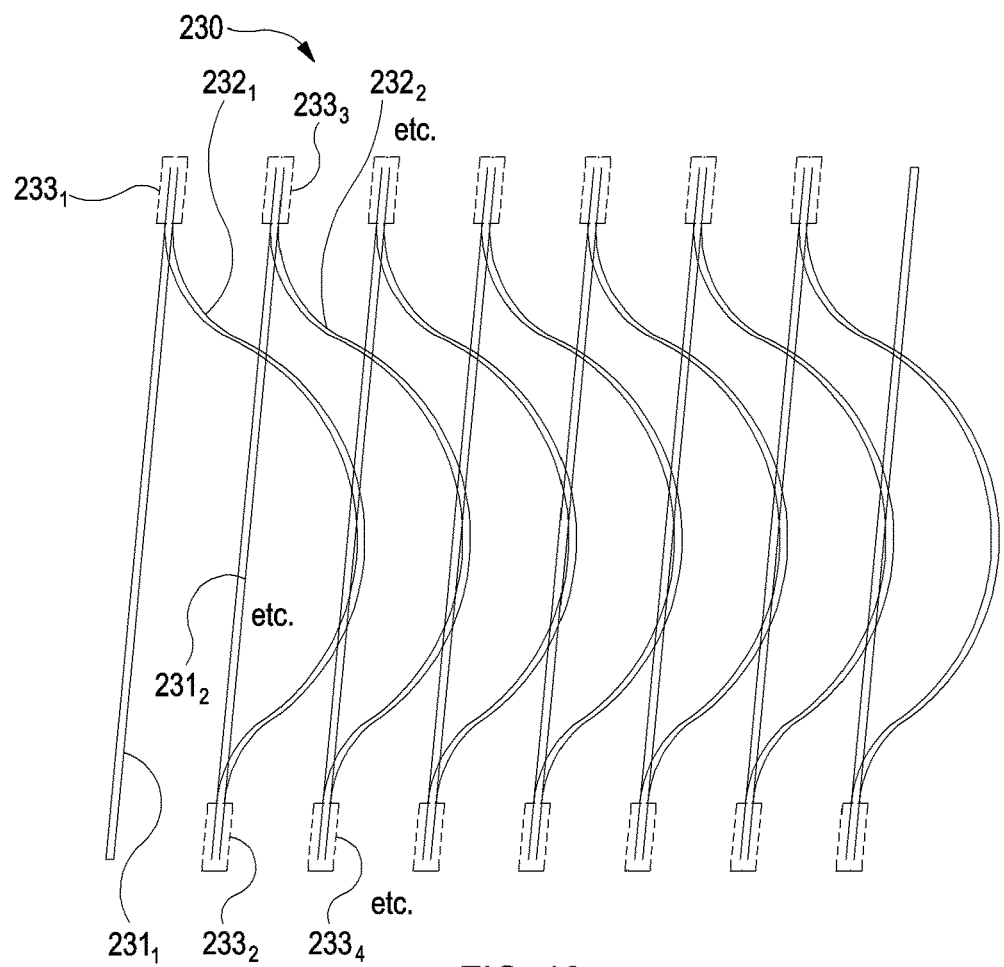
FIG. 10 illustrates some features of a magnet which may be used in the tokamak partly illustrated in FIG. 6A.

Referring to FIG. 10, another ("second") magnet 230 will now be described.

The second magnet 230 may be used in an equivalent tokamak to the first tokamak 10.

The second magnet 230 includes a plurality of straight conductors 231 (which may correspond to inner conductors) and a plurality of curved conductors 232 (which may correspond to outer conductors). In contrast to the above-described "first" magnet 30, all of the straight conductors 231 may be substantially the same as each other, and all of the curved conductors 232 may be substantially the same as each other. Each curved conductor 232 may follow a (three-dimensional) path that approximately corresponds to the shape of the outer conductors 32f of the abovedescribed magnet 30. The second magnet 230 includes a plurality of joints 233. Each joint 233 connects a straight conductor 231 and a curved conductor 232 to form a series of alternating straight and curved conductors $231_1$, $232_1$, $231_2$, $232_2$, etc. The conductors 231, 232 together form a distorted (half-Φ) helix.

Accordingly, the conductors 231, 232 of the second magnet 230 are arranged three-dimensionally (in a distorted helix), in contrast to the conductors 31f, 32f of the first magnet 30, which are arranged substantially two-dimensionally (in a distorted spiral).

Other magnets may have an arrangement of conductors with both spiral and helical properties.

As will be explained below, the intra-pancake joint may include solder 633a, and the inner and/or outer conductors 631f, 632f may include solder.

The inner and outer conductors 631f, 632f extend a particularly large distance away from the midplane. The joint 633 is positioned at the furthest extent (e.g. top) of each of the inner and outer conductors 631f, 632f.

Accordingly, the joint 633 is positioned in a particularly low field region 90, where an (operating) field 91 may be below an upper-critical field 92 of solder (e.g. the solder 633a) in the region of the joint 633.

The current flowing from one of the conductors 631f, 632f to the other generally flows via solder (e.g. the solder 633a) and, if the solder is in a superconducting state, then this may advantageously reduce the resistance of the joint 633.

The table below shows some properties of some solders:

| Solder alloy | Melting point (degrees Celsius) | Resistivity at room temp. ($10^{-7}$ ohm meters) | Resistivity at 77 kelvin ($10^{-7}$ ohm meters) | Critical temperature (kelvin) | Upper critical field at absolute zero (tesla) |
| --- | --- | --- | --- | --- | --- |
| $Bi_{49}Pb_{18}In_{21}Sn_{12}$ (Cerrolow 136) | 58 | 9.4 | 8.1 | 6.4 | 3.3 |
| $Pb_{20}Sn_{34}Bi_{46}$ | ~96 | 5.5 | 2.6 | 8.4 | 2.3 |
| $Pb_{20}Sn_{60}Bi_{20}$ | ~170 | 2.6 | 1.1 | 8.5 | 2.2 |
| $In_{52}Sn_{48}$ | 118 | 2.6 | 1.3 | 6.4 | 0.34 |
| $Pb_{38}Sn_{62}$ | 183 | 1.5 | 0.48 | 7.3 | 0.30 |
| $Pb_{57}Bi_{36}Sb_7$ | 200-230 | 6.1 | 3.7 | 8.5 | 2.5 |

The second magnet 230 may have any suitable structure (not shown) to support the conductors 231, 232.

Referring to FIGS. 11A-D, some further magnets will now be described.

Each magnet is a variation of the first magnet 30 and may be used in an equivalent tokamak to the first tokamak 10. In particular, each magnet has differently-shaped inner and outer legs to the first magnet 30. Each magnet generally has substantially the same (although suitably differently-shaped) components as the first magnet 30.

Figure 11:
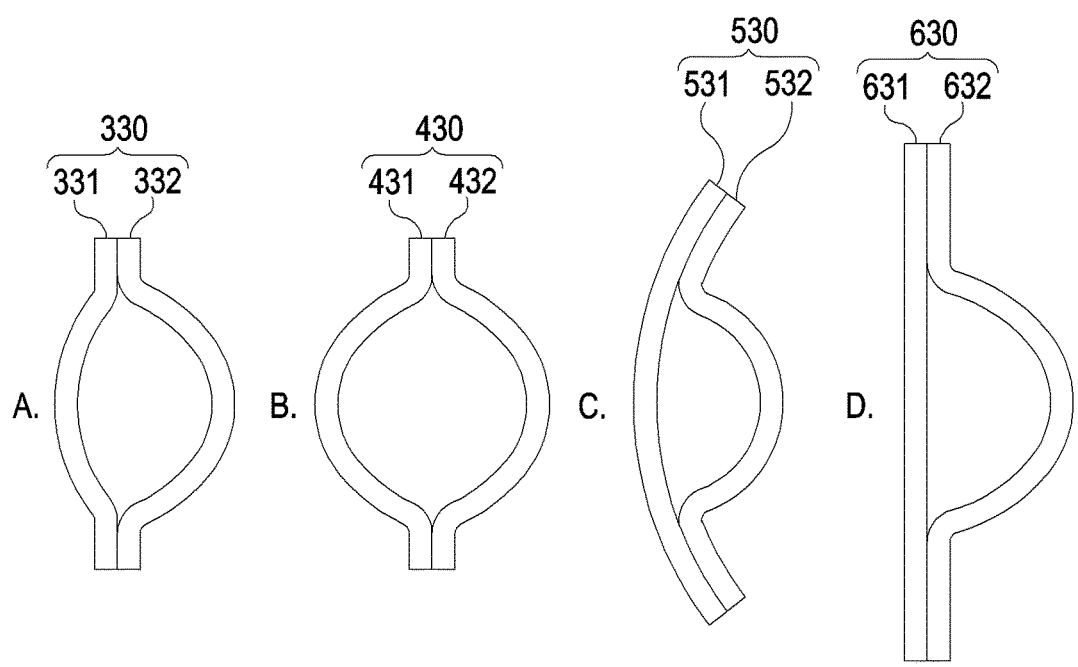
FIGS. 11A-D illustrate various magnets which may be used in the tokamak partly illustrated in FIG. 6A.

Referring to FIG. 11A, a "third" magnet 330 may include an inner leg 331 that curves slightly such that it partly mirrors the curvature of the outer leg 332. Thus, the third magnet 330 has a potential advantage of having a less curved outer leg 332 and/or joints that are positioned in less central, lower field regions.

Referring to FIG. 11B, a "fourth" magnet 430 may include substantially symmetrical inner and outer legs 431, 432, which is potentially advantageous.

Referring to FIG. 11C, a "fifth" magnet 530 includes an inner leg 531 which curves away from the main axis towards its uppermost and lowermost ends with a substantially constant curvature. The outer leg 532 has matching uppermost and lowermost parts.

Generally, the shape of a magnet and hence the conductors in the magnet may be tailored for better performance, for example by producing favourable operating stresses/strains in the conductors, by producing a favourable orientation of anisotropic superconductors relative to the (operating) field, by enabling straight conductors to be used, etc.

Referring to FIG. 11D, a "sixth" magnet 630 includes an extended inner leg 631 and an outer leg 632 with extended uppermost and lowermost parts.

Figure 12:
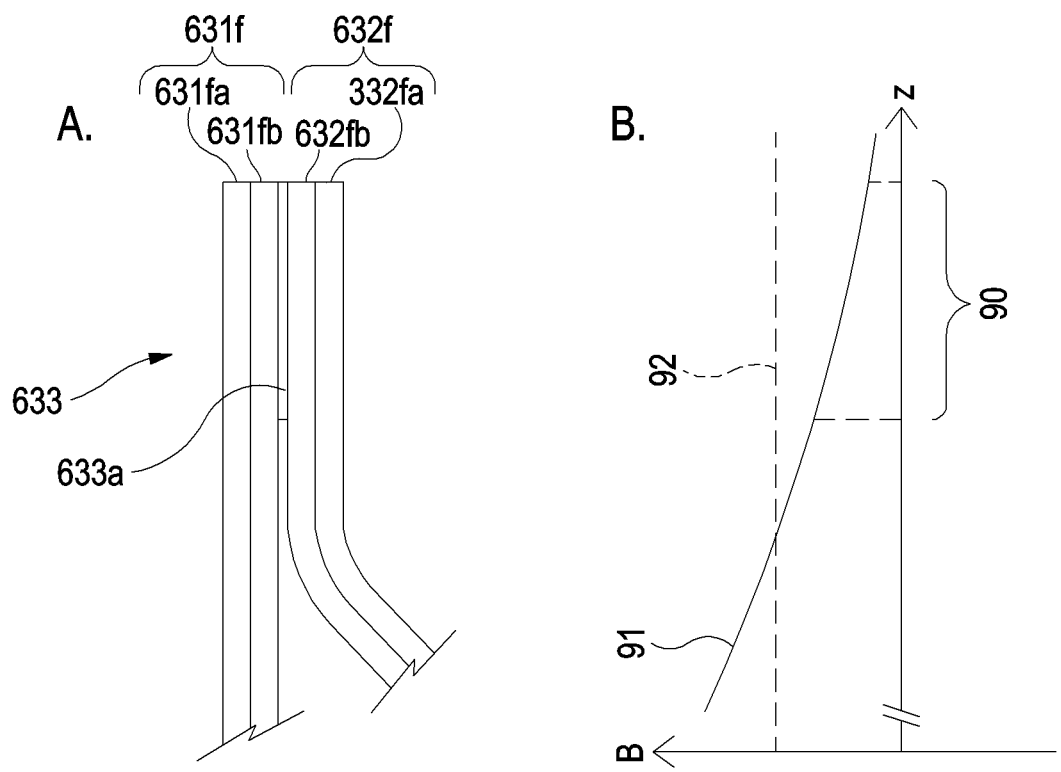
FIGS. 12A-B illustrate (A) a joint which may be part of the magnet illustrated in FIG. 11D and (B) fields in the region of the joint.

Referring to FIGS. 12A-B, an intra-pancake joint 633 between an inner conductor 631f and an outer conductors 632f of the sixth magnet 630 will now be described.

The upper critical field of certain solders, e.g. Cerrolow 136, is relatively high (i.e. of the order of 1 tesla at an operating temperature of ~4-5 kelvin). Such solders may be used to facilitate the abovedescribed positioning of the joint 633.

In the sixth magnet 630, each joint 633 may be particularly elongated (compared, for example, to the joints 33 illustrated in FIG. 7). Accordingly, each joint 633 may have a larger surface area, which may also reduce its resistance.

Regardless of the length of the joint 633, the (extended) uppermost and lowermost parts of the inner and outer conductors 631f, 632f may be positioned side-by-side to avoid unduly increasing the magnetic field energy.

As illustrated schematically in the figure, each conductor 631f, 632f may include a superconducting part 631fa, 632fa and a parallel normal part 631fb, 632fb. Each superconducting part 631fa, 632fa includes a number of superconducting strands (with circular cross-sections) or tapes (with rectangular cross-sections), and may also include solder. Each normal part 631fb, 632fb includes a high-conductivity metal such as copper, a copper alloy or a silver alloy. The current flowing from one of the conductors 631f, 632f to the other generally flows via the normal parts 631fb, 632fb.

The solder 633a may be omitted from the joint 633 and the joint 633 may be made by merely pressing together the conductors 631f, 632f. In such instances, the relevant surfaces of the conductors 631f, 632f are preferably substantially conformal.

A Magnet with Different Operating Temperatures

Figure 13:
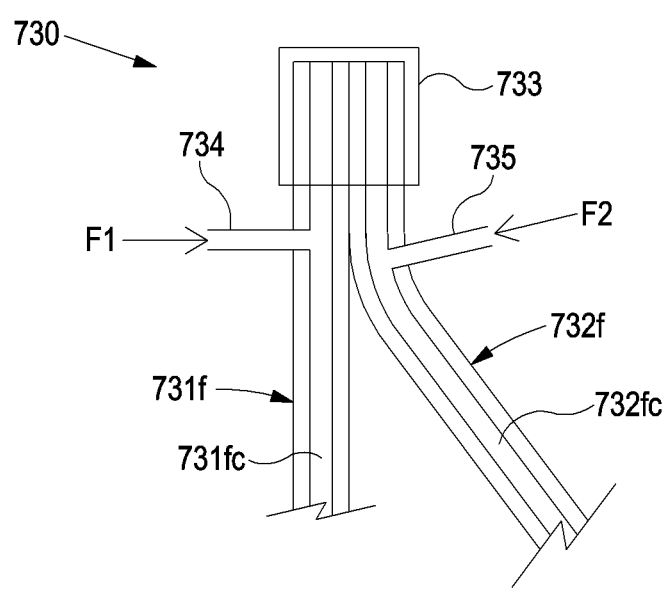
FIG. 13 illustrates a part of a magnet with two operating temperatures which may be used in the tokamak partly illustrated in FIG. 6A.

Referring to FIG. 13, a part of a "seventh" magnet 730 will now be described.

In the seventh magnet 730, the inner conductors 731f have a different operating temperature to the outer conductors 732f. As will be explained in more detail below, this may lead to a greater choice of superconductors and so may enable an improved magnet 730 to be produced (even though cooling the magnet 730 may be more complex).

Only a single joint 733 between an inner conductor 731_f_ and an outer conductor 732_f_ is illustrated in the figure and described below. The other joints and the other conductors of the seventh magnet 730 may be substantially the same.

Each of the inner and outer conductors 731_f_, 732_f_ is preferably a cable-in-conduit conductor, i.e. includes a (central) cooling channel 731_fc_, 732_fc_. Each cooling channel 731_fc_, 732_fc_ is closed at each of its ends by the relevant joints (e.g. by an intra-pancake joint 733, as illustrated in the figure) or in any suitable way.

A "first" (cryogenic) fluid F1 is introduced into the cooling channel 731_fc_ of the inner conductor 731_f_ via a first fluid input 734. The connection between the first fluid input 734 and the cooling channel 731_fc_ may be made in any suitable way, for example via the side (as illustrated in the figure) or via the end of the inner conductor 731_f_. The connection is preferably near an end of the inner conductor 731_f_. The first fluid F1 passes through the cooling channel 731_fc_ and exits near the other end of the inner conductor 731 via a first fluid output (not shown), which may be similar to the first fluid input.

A "second" (cryogenic) fluid F2 is introduced into the cooling channel 732_fc_ of the outer conductor 732_f_ via a suitable second fluid input 735. The second fluid F2 passes through the cooling channel 732_fc_ and exits via a suitable second fluid output (not shown).

The first fluid inputs and outputs of each of the inner conductors 731_f_ of the seventh magnet 730 may be connected to a "first" cryogenic system. The first cryogenic system controls, for example the temperature and pressure of the first fluid F1. Similarly, the second fluid inputs and outputs of each of the outer conductors 732_f_ of the seventh magnet 730 may be connected to a suitable "second" cryogenic system. Suitable cryogenic fluids include, for example, helium or nitrogen.

Different Inner and Outer Conductors

As explained above, the magnet (e.g. the first magnet 30) may have inner and outer conductors (e.g. the inner and outer conductors 31_f_, 32_f_) made from the same conductor and including the same superconductor.

However, additional advantages (beyond e.g. demountability, advantageous positioning of joints, etc.) may be obtained if the magnet has inner and outer conductors made from different conductors and/or including different superconductors. Such a magnet need not be demountable.

As explained above, an outer leg (e.g. the outer leg 32) is generally subject to different conditions, e.g. lower fields, than an inner leg (e.g. the inner leg 31). The inner and outer conductors may be tailored for these different conditions. This may involve taking advantage of differences between properties of different superconductors, for example differences between high-temperature superconductors (HTS) and low-temperature superconductors (LTS).

Figure 14:
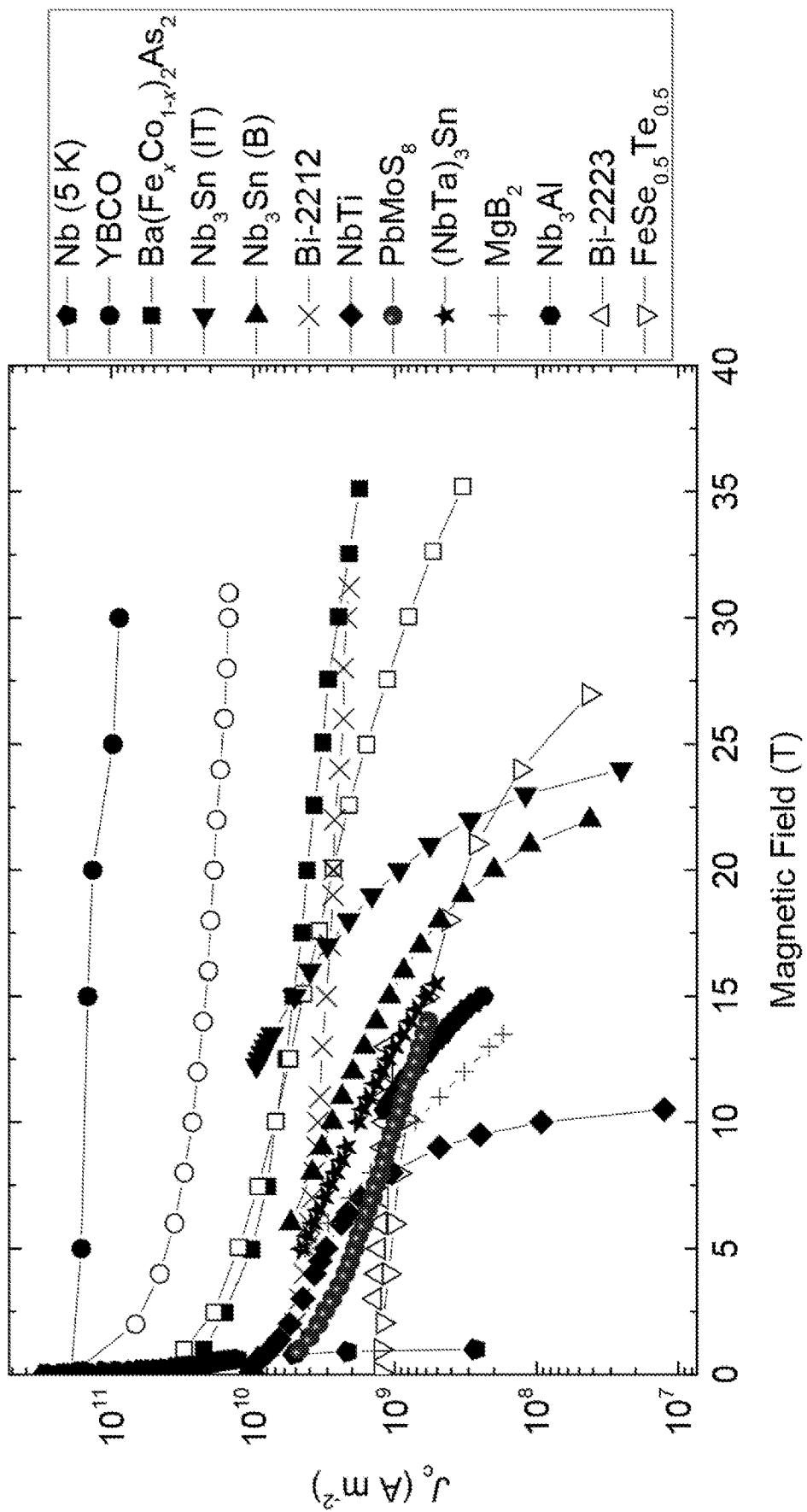
FIG. 14 shows the critical current density versus field at a temperature of generally 4.2 kelvin for various superconductors which may be used, for example, in the magnet illustrated in FIG. 6A.

FIG. 14 shows the critical current density of various candidate superconductors versus field at a temperature of 4.2 kelvin (except for niobium, which is at 5 kelvin). The critical current density corresponds to the critical current per unit area of the superconducting component of the superconductor. For anisotropic superconductors, closed and open symbols represent data with the field parallel and perpendicular to the a-b plane, respectively.

For all of the superconductors, the critical current (i.e. the maximum current that a superconductor can carry with ~zero resistance) decreases with increasing magnetic field and/or temperature. The critical current goes to zero at an upper critical field (i.e. the highest field in which a superconductor remains superconducting). The upper critical field decreases with increasing temperature.

As can be seen from the figure, HTS yttrium-barium-copper-oxide (YBCO) conductors have a relatively high critical current in high magnetic fields. Moreover, by using suitably aligned, anisotropic YBCO conductors (i.e. with the a-b planes generally parallel to the field), this critical current may be further increased.

Accordingly, YBCO conductors may be advantageously used in the inner leg of the magnet, where the (operating) fields are highest. In principle, this may enable the magnet to produce extremely high fields.

YBCO conductors may also be operated at relatively high temperatures (e.g. ~30 kelvin). This may lead to significant reductions in cooling costs. As mentioned above, the inner leg is subject to much higher levels of radiation and hence a much higher heat load due to the radiation, compared to the outer leg. Accordingly, maintaining the inner leg at relatively low temperatures (e.g. ~4-5 kelvin) requires relatively high cooling power.

However, the YBCO conductors themselves may be relatively high cost.

Accordingly, a superconductor with a lower cost may be advantageously used in the outer leg of the magnet.

For example, LTS niobium-titanium (NbTi) conductors may be used in the outer leg. Such conductors are relatively low cost and easy to work with (in particular, they are flexible). NbTi has an upper critical field of ~10 tesla at 4 kelvin and so its use is limited to relatively low magnetic fields (less than ~10 tesla) and relatively low temperatures (less than ~5 kelvin).

In this instance, where the inner leg includes YBCO conductors operated at a relatively high temperature (~30 kelvin), then the magnet will need two cryogenic systems. These may be configured as described above in relation to the seventh magnet 730.

Alternatively, HTS bismuth strontium calcium copper oxide (Bi-2212) conductors may be used in the outer leg. These are higher cost compared to NbTi conductors, but have advantages including that a single cryogenic system may be used to cool both inner and outer conductors to a similar temperature (~30 kelvin).

The inner and outer conductors may be optimised for use in the relevant fields. For example, the inner and outer conductors may be selected such that they can just safely (i.e. with appropriate margin(s)) carry the operating current with ~zero resistance in the relevant field.

The upper critical field of the inner conductor will generally be higher than that of the outer conductor.

The use of different inner and outer conductors may also enable the radiation tolerance of the magnet to be increased without unnecessarily increasing its cost. As explained above, the inner leg is subject to higher levels of radiation than the outer leg. Accordingly, a conductor which is higher cost but less prone to radiation damage may be advantageously used in the inner leg.

As will be appreciated, the flexibility provided by different inner and outer conductors opens up possibilities for magnets for commercial tokamaks with higher magnetic fields, lower costs, greater reliability, etc.

Other Variations

It will be appreciated that there may be many other variations of the abovedescribed embodiments.

For example, instead of the magnet corresponding to a TF coil of the tokamak 10, the magnet may be used in another different type of tokamak. For example, the magnet may be used in a spherical tokamak. A spherical tokamak has an aspect ratio (i.e. a ratio of the major radius to the minor radius of a toroidal region occupied by the plasma) that is relatively small (e.g. less than 2 or less than 1.5). In other words, the plasma and hence the toroidal vacuum vessel have a relatively small central hole. Accordingly, the inner leg of the magnet may be subject to higher magnetic fields and higher levels of radiation and there may be less space available for it (and so higher critical current densities may be required). In these circumstances, dividing the magnet into different inner and outer legs including different superconductors with different properties may be particularly important to meet these requirements at a reasonable cost.

Furthermore, the magnet may be used in a device other than a tokamak, such as a stellarator.

The magnet may include additional intra-pancake joints (and hence additional conductors). For example, there may be a pair of joints between inner and outer conductors.

The joints may have any suitable shape, size and orientation.

Relatively high levels of ohmic heating in a joint may be tolerated in some instances. This may be because of the distance between the joint and the part of the magnet that produces the toroidal field.

The conductors may have any suitable shape. For example, one or more conductors may follow a path that turns and then approaches a joint in a direction substantially towards the midplane.

The inner and outer conductors may include the same superconductor, but may have other differences, e.g. different sizes, shapes, non-superconducting components, different versions of the same superconductor, etc. The conductors may include a combination of two or more different superconductors. The inner conductors may comprise a different such combination from the outer conductors.

The invention claimed is:

1. A superconducting magnet for producing part of a substantially toroidal field in a device, the toroidal field having an axis of rotation and a perpendicular midplane, and the magnet comprising:
    a set of conductors comprising:
        a first inner superconducting conductor, the first inner superconducting conductor comprising an elongated region that extends substantially parallel to the axis of rotation and that is proximate an end of the first inner superconducting conductor at a furthest extent of the first inner superconducting conductor from the midplane in a first direction,
        a first outer superconducting conductor, the first outer superconducting conductor comprising a first elongated region that extends substantially parallel to the axis of rotation and that is proximate a first end of the first outer superconducting conductor at a furthest extent of the first outer superconducting conductor from the midplane in the first direction and a second elongated region that extends substantially parallel to the axis of rotation and that is proximate a second end of the first outer superconducting conductor at a furthest extent of the first outer superconducting conductor from the midplane in a second direction that is opposite the first direction, and
        a second inner superconducting conductor, the second inner superconducting conductor comprising a first elongated region that extends substantially parallel to the axis of rotation and that is proximate a first end of the second inner superconducting conductor at a furthest extent of the second inner superconducting conductor from the midplane in the first direction and a second elongated region that extends substantially parallel to the axis of rotation and that is proximate a second end of the second inner superconducting conductor at a furthest extent of the second inner superconducting conductor from the midplane in the second direction; and
    a set of joints comprising a first joint and a second joint;
    wherein:
        the first joint connects the elongate region of the first inner superconducting conductor with the first elongate region of the first outer superconducting conductor;
        the second joint connects the second elongate region of the second inner superconducting conductor with the second elongate region of the first outer superconducting conductor; and
        the second joint is positioned at a different distance from the rotation axis and at a different distance from the midplane with respect to the first joint.

2. A magnet according to claim 1, having a "D" shape.

3. A magnet according to claim 1, wherein the joint comprises solder having an upper critical field that is higher than a maximum operating field at the position of the joints in use.

4. A magnet according to claim 1, wherein a portion of the first outer superconducting conductor comprises a second region that extends in a direction that is not parallel to the axis of rotation, wherein the second region is distinct from the first elongated region of the first outer superconducting conductor.

5. A magnet according to claim 1, wherein one of the first inner superconducting conductor or the first outer superconducting conductor behaves as a superconductor at a first temperature, and another of the first inner superconducting conductors or the first outer superconducting conductor behaves as a superconductor at a second temperature, wherein the first temperature is higher than the second temperature.

6. A magnet according to claim 1, wherein, under a set of operating conditions:
    said first inner superconducting conductor has a first critical current at a first field; and
    said first outer superconducting conductor has a second critical current at a second, lower field;
    wherein the first and second fields correspond to maximum operating fields in regions of the device to be occupied by the first inner and first outer superconducting conductors, respectively; and
    wherein the first and second critical currents exceed the operating current by first and second margins, respectively.

7. A magnet according to claim 1, wherein said first inner superconducting conductor comprises a superconductor having a first upper critical field corresponding to a first magnetic flux density; and
    said first outer superconducting conductor comprises a superconductor having a second upper critical field corresponding to a second magnetic flux density, wherein the first upper critical field magnetic flux density is higher than the second upper critical field magnetic flux density.

8. A magnet according to claim 1, wherein the set of conductors comprises three inner superconducting conductors and three outer superconducting conductor.

9. A magnet according to claim 1 wherein:
the set of conductors further comprises a second outer superconducting conductor, the second outer superconducting conductor comprising a first elongated region that extends substantially parallel to the axis of rotation and that is proximate a first end of the second outer superconducting conductor at a furthest extent of the second outer superconducting conductor from the midplane in the first direction;
the set of joints further comprises a third joint; and
the third joint connects the first elongate region of the second inner superconducting conductor with the first elongate region of the second outer superconducting conductor.

10. A magnet according to claim 9, wherein the third joint is positioned on a line parallel with the rotation axis and at a different distance from the midplane with respect to the first joint and the second joint.

11. A superconducting magnet for producing part of a substantially toroidal field in a device, the toroidal field having an axis of rotation and a perpendicular midplane, and the magnet comprising:
a set of conductors comprising:
a first inner superconducting conductor, the first inner superconducting conductor comprising an elongated region that extends substantially parallel to the axis of rotation and that is proximate an end of the first inner superconducting conductor at a furthest extent of the first inner superconducting conductor from the midplane in a first direction,
a first outer superconducting conductor, the first outer superconducting conductor comprising a first elongated region that extends substantially parallel to the axis of rotation and that is proximate a first end of the first outer superconducting conductor at a furthest extent of the first outer superconducting conductor from the midplane in the first direction and a second elongated region that extends substantially parallel to the axis of rotation and that is proximate a second end of the first outer superconducting conductor at a furthest extent of the first outer superconducting conductor from the midplane in a second direction that is opposite the first direction, and
a second inner superconducting conductor, the second inner superconducting conductor comprising a first elongated region that extends substantially parallel to the axis of rotation and that is proximate a first end of the second inner superconducting conductor at a furthest extent of the second inner superconducting conductor from the midplane in the first direction and a second elongated region that extends substantially parallel to the axis of rotation and that is proximate a second end of the second inner superconducting conductor at a furthest extent of the second inner superconducting conductor from the midplane in the second direction; and
a set of joints comprising a first joint and a second joint; wherein:
the first joint connects the elongate region of the first inner superconducting conductor with the first elongate region of the first outer superconducting conductor;
the second joint connects the second elongate region of the second inner superconducting conductor with the second elongate region of the first outer superconducting conductor; and the second joint is positioned on a line parallel with the rotation axis and at a different distance from the midplane with respect to the first joint.

12. A magnet according to claim 11 wherein:
the set of conductors further comprises a second outer superconducting conductor, the second outer superconducting conductor comprising a first elongated region that extends substantially parallel to the axis of rotation and that is proximate a first end of the second outer superconducting conductor at a furthest extent of the second outer superconducting conductor from the midplane in the first direction;
the set of joints further comprises a third joint; and
the third joint connects the first elongate region of the second inner superconducting conductor with the first elongate region of the second outer superconducting conductor.

13. A magnet according to claim 12, wherein the third joint is positioned at a different distance from the rotation axis and at a different distance from the midplane with respect to the first joint and the second joint.

14. A magnet according to claim 11, having a "D" shape.

15. A magnet according to claim 11, wherein the joint comprises solder having an upper critical field that is higher than a maximum operating field at the position of the joints in use.

16. A magnet according to claim 11, wherein a portion of the first outer superconducting conductor comprises a second region that extends in a direction that is not parallel to the axis of rotation, wherein the second region is distinct from the first elongated region of the first outer superconducting conductor.

17. A magnet according to claim 11, wherein one of the first inner superconducting conductor or the first outer superconducting conductor behaves as a superconductor at a first temperature, and another of the first inner superconducting conductors or the first outer superconducting conductor behaves as a superconductor at a second temperature, wherein the first-temperature is higher than the second temperature.

18. A magnet according to claim 11, wherein, under a set of operating conditions:
said first inner superconducting conductor has a first critical current at a first field; and
said first outer superconducting conductor has a second critical current at a second, lower field;
wherein the first and second fields correspond to maximum operating fields in regions of the device to be occupied by the first inner and first outer superconducting conductors, respectively; and
wherein the first and second critical currents exceed the operating current by first and second margins, respectively.

19. A magnet according to claim 11, wherein said first inner superconducting conductor comprises a superconductor having a first upper critical field corresponding to a first magnetic flux density; and
said first outer superconducting conductor comprises a superconductor having a second upper critical field corresponding to a second magnetic flux density, wherein the first upper critical field magnetic flux density is higher than the second upper critical field magnetic flux density.

20. A magnet according to claim 11, wherein the set of conductors comprises three inner superconducting conductors and three outer superconducting conductor.

* * * * *